United States Patent [19]

Dengler et al.

[11] 4,067,889
[45] Jan. 10, 1978

[54] DISPERSE DYESTUFFS

[75] Inventors: Siegfried Dengler, Choex; Peter Loew, Munchenstein; Christian Zickendraht, Binningen; Hansrudolf Schwander, Riehen, all of Switzerland

[73] Assignee: Ciba-Geigy Corporation, Ardsley, N.Y.

[21] Appl. No.: 669,011

[22] Filed: Mar. 22, 1976

Related U.S. Application Data

[62] Division of Ser. No. 480,085, June 17, 1974, Pat. No. 3,970,675.

[51] Int. Cl.² .................................................. C09B 3/02
[52] U.S. Cl. .................................... 260/364; 548/301; 548/347; 260/269; 260/283 R; 260/288 R; 260/289 R; 260/290 R; 260/290 H; 260/293.51; 260/293.54; 260/293.57; 260/293.59; 260/293.72; 544/106; 8/76; 8/83
[58] Field of Search .......................................... 260/364

[56] References Cited
U.S. PATENT DOCUMENTS

| 1,628,280 | 5/1927 | Schmidt et al. | 260/364 |
| 2,821,533 | 1/1958 | Tsang | 260/364 |
| 3,987,026 | 10/1976 | Koller et al. | 260/364 X |

Primary Examiner—Paul F. Shaver
Attorney, Agent, or Firm—Edward McC. Roberts; Prabodh I. Almaula

[57] ABSTRACT

Dyestuffs of the formula (I)

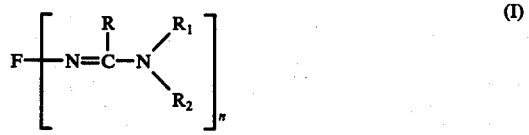

wherein F represents a ring system with at least 3 rings which are angularly condensed with one another, $n$ is 1, 2 or 3, and R, $R_1$ and $R_2$ represent optionally substituted alkyl groups which can be interrupted by heteroatoms and also represent cycloalkyl, aralkyl, aryl or heterocyclic radicals, R and $R_1$ can also represent hydrogen atoms, $R_1$ and $R_2$, together with the nitrogen atom, are able to form a ring with 5 or 6 members, and R and $R_2$ can combine to form a nitrogen-containing heterocycle.

2 Claims, No Drawings

DISPERSE DYESTUFFS

This is a divisional of application Ser. No. 480,085, filed on June 17, 1974, now U.S. Pat. No. 3,970,675, The present invention provides dyestuffs of the formula (I)

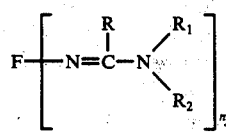

wherein F represents a ring system with at least 3 rings which are angularly condensed with one another, $n$ is 1, 2 or 3, and R, $R_1$ and $R_2$ represent optionally substituted alkyl groups which can be interrupted by heteroatoms and also represent cycloalkyl, aralkyl, aryl or heterocyclic radicals, R and $R_1$ can also represent hydrogen atoms, $R_1$ and $R_2$, together with the nitrogen atom, are able to form a ring with 5 or 6 members, and R and $R_2$ can combine to form a nitrogen-containing heterocycle.

Possible radicals R, $R_1$ and $R_2$ are alkyl radicals which can be the same or different, e.g. methyl, ethyl, propyl, butyl, pentyl, hexyl, heptyl, octyl, nonyl or decyl radicals, substituted alkyl radicals, e.g. β-chloroethyl, β-hydroxyethyl, β-cyanoethyl, γ-cyanopropyl, β-methoxyethyl, β-acetoxyethyl, β-butyryloxyethyl, methoxycarbonylethyl, ethoxycarbonylethyl, also cyclohexyl, phenylethyl or benzyl radicals, aryl radicals, e.g. phenyl, and phenyl radicals which are substituted in ortho-, meta- or para-position by methyl, ethyl, propyl, methoxy, ethoxy, and/or cyano, chlorine, bromine, nitro, acetylamino. Radicals $R_1$ and $R_2$ which are bonded to each other form e.g. the piperidine, morpholine, acetylpiperazine, indoline, and, in particular, the tetrahydroquinoline ring. In both these last mentioned cases, the amidine group preferably has the formulae

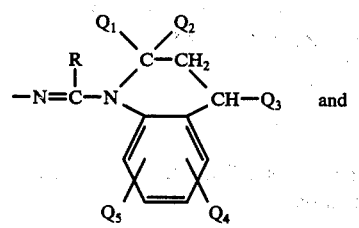

and

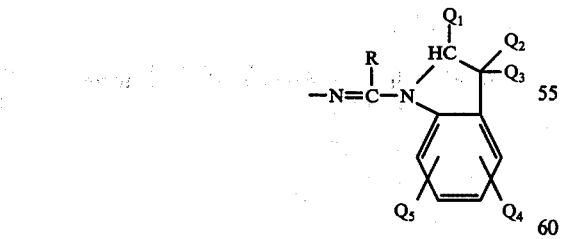

wherein $Q_1$, $Q_2$ and $Q_3$ represent hydrogen or lower alkyl groups, e.g. methyl groups, and $Q_4$ and $Q_5$ represent hydrogen atoms, halogen atoms, lower alkoxy groups or lower alkylcarbonylamino groups.

If the radicals R and $R_2$ combine to form a nitrogen-containing heterocycle, the group $-N=CR-NR_1R_2$ has the formula

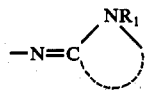

wherein the dotted ring completes a heterocycle of the formula

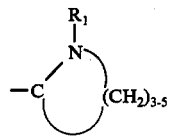

e.g. the N-methylpyrrolidone radical or the N-alkylcaprolactam radical, in which $R_1$ represents a hydrogen atom, a lower alkyl radical or a phenyl-lower alkyl radical.

In this specification, lower alkyl and lower alkoxy radicals are radicals with 1 to 4 carbon atoms. They represent at the same time the preferred form of the alkyl and alkoxy groups, unless it is otherwise stated.

The dyestuff radicals F from which the dyestuffs to be used according to the invention are derived contain as a rule no acid, water-solubilising groups and are dyestuffs of the disperse series.

R can have, for example, the following meanings: H, $-CH_3$, $C_2H_5$, $-C_3H_7$, $-C_4H_9$, $-C_5H_{11}$, $-C_{17}H_{35}$, $NC-CH_2-$, $CH_3-O-CH_2-$, $C_2H_5-O-CH_2-$, $CH_3-O-C_2H_4-$, $-CF_3$, $C_2H_5OOC-CH_2-CH_2-$, $NC-CH_2-CH_2-$, $(CH_3)_2N-CH_2-$, $CH_2=CH-$, $CH_3-CH=CH-$, $CH_2=C(CH_3)-$, $(C_2H_5)_2CH-$, $CH_3.CO.CH_2-$, $C_6H_5.CH_2-$, $C_6H_5-O-CH_2-$,

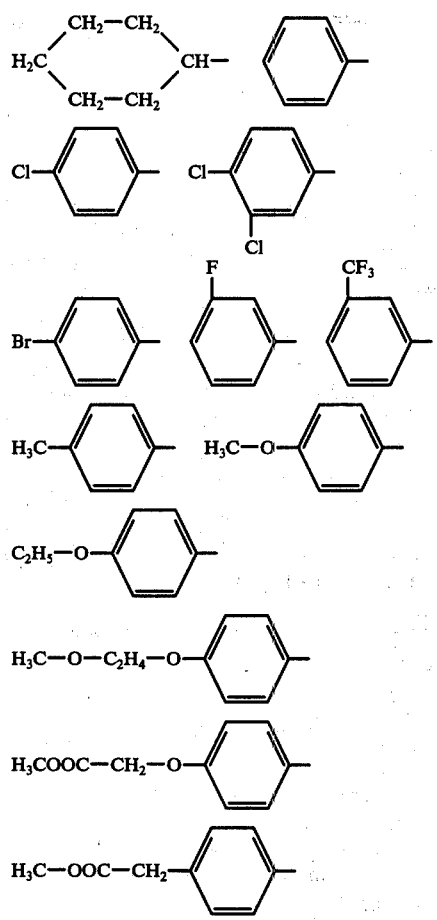

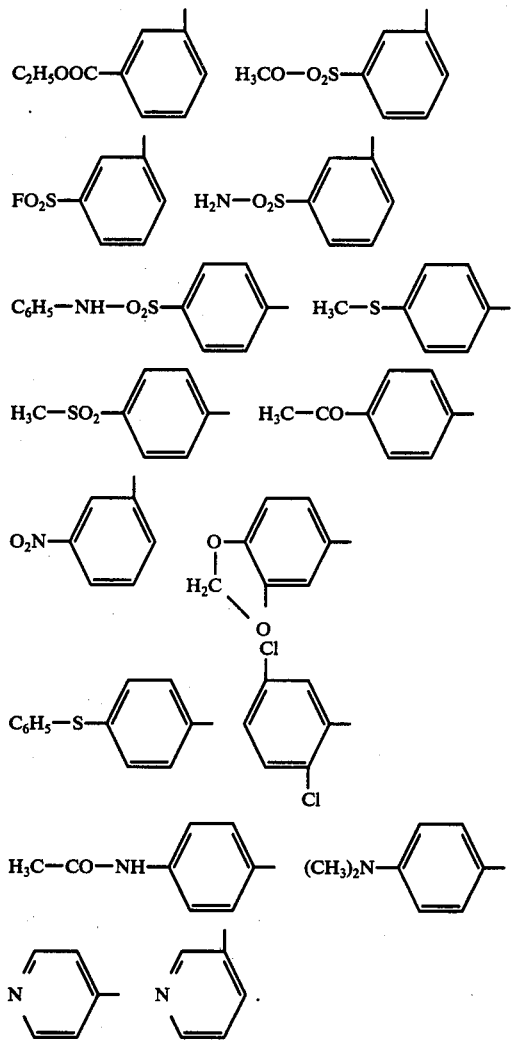

If $R_2$ and $R_3$, together with the nitrogen atom, form an indoline or tetrahydroquinoline system, this system can be derived from the following tetrahydroquinolines or indolines:

2,2,4,7-tetramethyl-tetrahydroquinoline
2,7-dimethyl-tetrahydroquinoline
2-isopropyl-7-methyl-tetrahydroquinoline
2-methyl-7-ethoxy-tetrahydroquinoline
7-methyl-tetrahydroquinoline
2,2,4-trimethyl-tetrahydroquinoline
2-methyl-7-acetamidomethyl-tetrahydroquinoline
7-acetamidomethyl-tetrahydroquinoline
2,4,4-trimethyl-7-acetamidomethyl-tetrahydroquinoline
7-methoxy-tetrahydroquinoline
7-acetylamino-tetrahydroquinoline
5-chloro-tetrahydroquinoline
5-bromo-tetrahydroquinoline
7-chloro-tetrahydroquinoline
7-bromo-tetrahydroquinoline
2-methyl-8-methoxy-tetrahydroquinoline
3-methoxy-5-formylamino-tetrahydroquinoline
5-fluoro-tetrahydroquinoline
5-propionylamino-tetrahydroquinoline
7-butyrylamino-tetrahydroquinoline
7-fluoro-tetrahydroquinoline
7-ethyl-tetrahydroquinoline
7-propionylamino-tetrahydroquinoline
2-methylindoline, 2-phenylindoline and 2,2-dimethylindoline and 2,3,3-trimethylindoline.

The cited 1,2,3,4-tetrahydroquinolines and indolines and the N-formyl derivatives thereof are also possible starting materials for the manufacture of the amidine dyestuffs according to the invention.

Angularly condensed ring systems are those with at least 3 rings fused to one another through which no axis can be drawn. The smallest angular units have the formulae

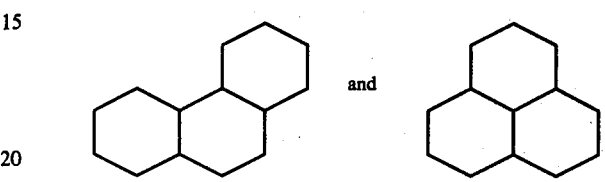

in which there can be present one or more ring atoms or heteroatoms, in particular nitrogen, sulphur or oxygen atoms.

Examples of tetracyclic anthraquinone radicals are 1,9-isothiazole-anthrone, 1,9-anthrapyrimidine, 1,9-pyrazoleanthrone or N-methyl-1,9-anthrapyridone.

The dyestuffs used according to the invention can be manufactured (a) from the amidinium salts of the formula

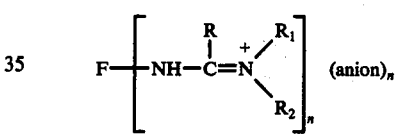

wherein F, R, $R_1$, $R_2$ and $n$ have the same meanings as given hereinbefore, by reaction with a base to yield the dyestuffs of the formula

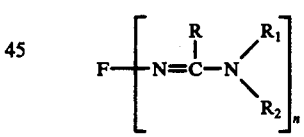

or (b) by reaction of dyestuffs containing primary amino groups of the formula

with $n$ moles of an amidacetal of the formula

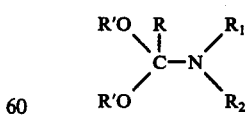

according to the reaction scheme

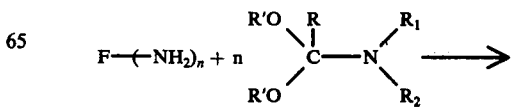

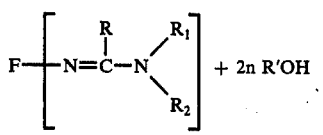

As starting materials for the manufacture of the amidine dyes it is possible to use e.g. the dyestuffs with amidinium groups which are described in Belgian Pat. No. 657 303.

Preferred representatives with at least 3 angularly condensed rings are the dyestuffs of the formula

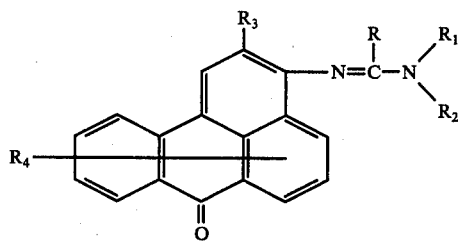

wherein R, $R_1$ and $R_2$ have the same meanings as hereinbefore and $R_3$ represents an organic radical or a hydrogen atom, but represents preferably an electron-negative organic radical with a positive sigma value in the Hammet equation, and $R_4$ represents a halogen atom, a lower alkyl group or, preferably, hydrogen, whereby there are to be understood substituents which at the aromatic ring are more negative than hydrogen atoms. A list of such substituents is to be found in Jaffe, Chemical Reviews, Vol. 53, p. 191 (1953), and especially on pages 219-233. Suitable as group $R_3$ is hydrogen or preferably a cyano group, a radical of the formulae

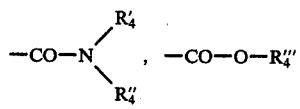

or a radical of a diazo component from which the amino group has been removed of the thiazole, benzthiazole, naphthothiazole, isothiazole, benzisothiazole, thiophene, imidazole, benzimidazole, thiadiazole, pyridine, quinoline, indazole, selenazole, oxazole, oxadiazole, tetrazole, benzoxazole, pyrazole or triazole series, but preferably a component of the benzimidazole or benzthiazole series. $R_4'$, $R_4''$ and $R_4'''$ are optionally substituted alkyl groups which can be interrupted by heteroatoms, aralkyl groups or aryl groups, and $R_4'$ and $R_4''$, together with the nitrogen atom, are able to form a ring with 5 or 6 members. In particular, $R_4'$, $R_4''$ and $R_4'''$ represent alkyl radicals which can be the same or different, e.g. methyl, ethyl, propyl, butyl, pentyl, hexyl, heptyl, octyl, nonyl or decyl radicals, substituted alkyl radicals, e.g. β-chloroethyl, β-hydroxyethyl, β-cyanoethyl, γ-cyanopropyl, β-methoxyethyl, β-acetoxyethyl, β-butyryloxyethyl, methoxycarbonylethyl, ethoxycarbonylethyl, phenylethyl or benzyl radicals, aryl radicals, e.g. phenyl, or phenyl which is substituted in ortho-, meta- or para-position by methyl,ethyl,propyl,methoxy, ethoxy and/or cyano, chlorine, bromine, nitro, acetylamino. Radicals $R_4'$ and $R_4''$ bonded to each other form e.g. the piperidine, morpholine or acetylpiperazine ring.

If $R_3$ represents the radical of a heterocyclic diazo component from which the amino group has been removed, then it represents a thiazolyl radical which is optionally substituted by chlorine or bromine atoms, nitro, cyano, thiocyano, lower alkyl, lower alkoxy, lower alkylmercapto, phenyl, benzyl, phenethyl, lower alkoxycarbonyl, trifluoromethyl, lower alkylcarbonyl and lower alkylsulphonyl groups, a benzthiazolyl radical which is optionally substituted by chlorine or bromine atoms, cyano, thiocyano, nitro, lower alkyl, lower alkoxy, benzyl, phenethyl, lower alkylsulphonyl, phenyl, lower alkylmercapto, lower alkoxycarbonyl, lower alkylcarbonyl, trifluoromethyl or cyanoethylsulphonyl groups, a pyrazolyl radical which is optionally substituted by cyano, lower alkyl, lower alkoxy, lower alkoxycarbonyl or phenyl groups, a thiadiazolyl radical which is optionally substituted by lower alkoxy, lower alkyl, phenyl, lower alkylsulphonyl or lower alkylmercapto groups, an imidazolyl radical which is optionally substituted by nitro or lower alkyl groups, a thienyl radical which is optionally substituted by nitro, lower alkyl, lower alkylsulphonyl, lower alkoxycarbonyl or acetyl groups, an isothiazolyl radical which is optionally substituted by lower alkyl, nitro, lower alkylsulphonyl, lower alkoxycarbonyl, cyano or phenyl groups, and a benzisothiazolyl radical which is optionally substituted by lower alkyl groups, nitro groups or halogen atoms. Preferably the heterocyclic radicals are unsubstituted, halogenated, or substituted by lower alkyl groups. Lower alkyl groups are, for example, methyl, ethyl, propyl, isopropyl and isobutyl radicals. Alkoxy radicals are restricted in analogous manner to 1 to 4 carbon atoms. It is particularly preferred that $R_3$ represents a cyano group and $R_4$ a hydrogen atom. Dyestuffs of the preferred kind are those of the formulae

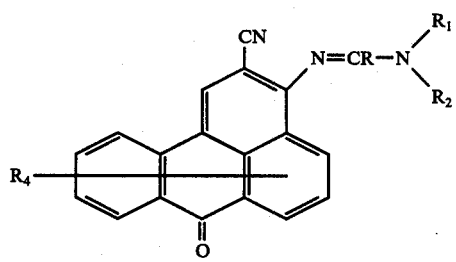

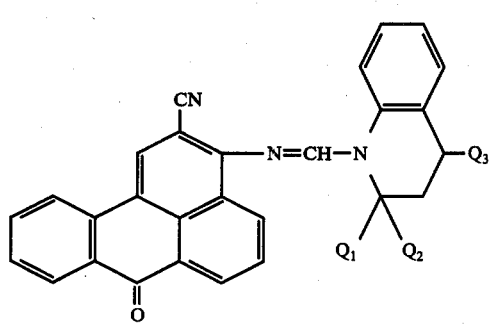

wherein $R_1$ and $R_2$ are part of a tetrahydroquinoline system and $R_4$, $Q_1$, $Q_2$, $Q_3$, $Q_4$ and $Q_5$ have the meanings given hereinbefore but are preferably hydrogen atoms.

Valuable dyestuffs with 3 angularly condensed rings are also those of the formula

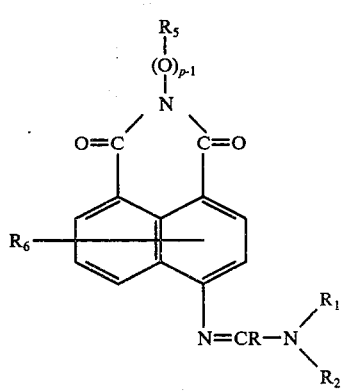

wherein R, $R_1$ and $R_2$ have the same meanings as hereinbefore, $R_5$ represents an optionally substituted alkyl radical which is optionally interrupted by heteroatoms, an aralkyl radical, a cycloalkyl radical, an aryl radical or a heterocyclic radical, p is 1 or 2 and $R_6$ represents a lower alkyl group, a chlorine or a bromine atom or preferably a hydrogen atom.

$R_5$ is, for example, an alkyl group, e.g. the methyl, ethyl, propyl, butyl, pentyl, hexyl, heptyl, octyl, nonyl or decyl radical, a substituted alkyl radical, e.g. the β-chloroethyl, β-hydroxyethyl, β-cyanoethyl, γ-cyanopropyl, β-methoxyethyl, β-acetoxyethyl, β-butyryloxyethyl, β-methoxycarbonylethyl, β-ethoxycarbonylethyl, phenylethyl or benzyl radical, cyclohexyl, o- or p-nitrobenzyl o-, m- or p-methylbenzyl or o- or m-chlorobenzyl.

The aryl radicals which are preferably suitable are the unsubstituted phenyl radical, the phenyl radical which is optionally substituted by halogen atoms, cyano, thiocyano, nitro, lower alkyl, trifluoromethyl, lower alkoxy, formyl, lower alkylcarbonyl, benzoyl, methylbenzoyl, lower alkoxycarbonyl, benzyloxycarbonyl, cyclohexyloxycarbonyl, phenoxycarbonyl, lower alkoxycarbonyloxy, benzyloxycarbonyloxy, lower alkylcarbonyloxy, benzoyloxy, lower monoalkylaminocarbonyl, di(lower alkyl) aminocarbonyl, lower alkylcarbonylamino, benzoylamino, lower alkylsulphonyl, chloroethylsulphonyl, lower alkylsulphonyloxy, cyclohexylsulphonyloxy, chloromethylsulphonyloxy, cyanoethylsulphonyloxy, phenylsulphonyloxy, aminosulphonyloxy, (chloro- or methoxy)phenylsulphonyloxy, N-morpholinosulphonyloxy, ethyleneiminosulphonyloxy, lower monoalkylamino- or dialkylaminosulphonyloxy, phenylaminosulphonyloxy, N-phenyl-N(lower alkyl)-aminosulphonyloxy, N-(methoxy- or chloro-phenylaminosulphonyloxy, phenylamino, nitrophenylamino, dinitrophenylamino, phenyl, phenoxy and/or acetylaminophenyl groups, a phenylazophenyl radical which is optionally substituted by chlorine or bromine atoms, cyano, nitro, lower alkyl, trifluoromethyl, lower alkoxy or phenoxy groups, a naphthyl radical which is optionally substituted by methoxy, ethoxy or phenylazo groups. Preferred substituents at the aryl radical $R_5$ are lower alkyl, chlorine or bromine.

Other valuable dyestuffs are the naphthoylene-perinones of the formula

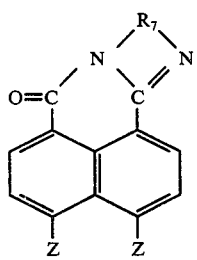

wherein $R_7$ represents an optionally substituted aryl radical bonded in 1,2-position, and one Z represents a hydrogen atom and the other Z represents a radical of the formula

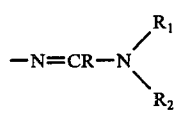

wherein R, $R_1$ and $R_2$ have the same meanings as hereinbefore. The radical $R_7$ is, for example, a naphthylene radical or preferably an o-phenylene radical which can be substituted e.g. by lower alkyl, lower alkoxy, phenyl, di(lower alkyl)-amino, nitro, lower alkylcarbonylamino groups or by halogen atoms, for example bromine or chlorine. Particularly valuable dyestuffs are those which are substituted by the nitro group. In the commercial manufacture of the naphthoylene perinones there ordinarily occur mixtures of the products which are substituted in the 4- or 5-position (i.e. the free periposition). If the phenylene radical also carries a substituent, then up to 4 isomers occur which can be resolved e.g. by chromatography. In actual practice it is almost always superfluous to separate the resulting mixtures because these isomer mixtures have better affinity for synthetic fibres, in particular polyester fibres, than the pure isomers. A better biuld-up of the dyestuffs is obtained with the dyestuff mixture, deep shades are more readily obtained and there is better exhaustion of the dyebath.

Finally, the dyestuffs with at least 3 angularly condensed rings comprise those of the formula

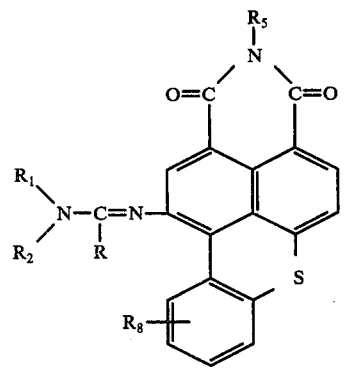

wherein R, $R_1$, $R_2$ and $R_5$ have the same meanings as hereinbefore and $R_8$ represents a chlorine atom, a methyl, a methoxy, a cyano, a carbomethoxy, an acetoxy radical or, preferably, a hydrogen atom.

Further valuable dyestuffs are those of the formula

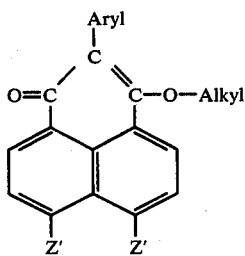

wherein one Z' represents a hydrogen atom and the other Z' represents a radical of the formula —N=CR—NR₁R₂, in which R, R₁ and R₂ have the meanings given hereinbefore. The aryl radical and the alkyl radical can carry further substituents.

Dyestuffs of the formulae F—NH₂, F—NH-alkyl, and/or F-N(alkyl)₂, wherein F represents the dyestuff radical cited in the definition of the invention, are described e.g. in the Colour Index and preferably as dyestuffs which are sparingly soluble or insoluble in water.

Further dyestuffs can be obtained from the amidinium salts listed hereinbelow by treatment with alkali.

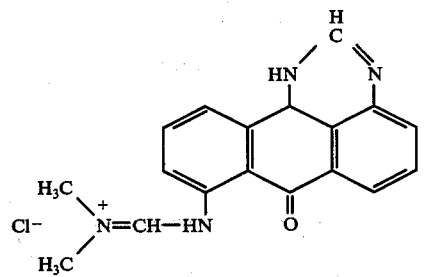

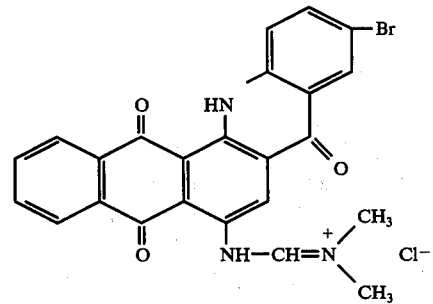

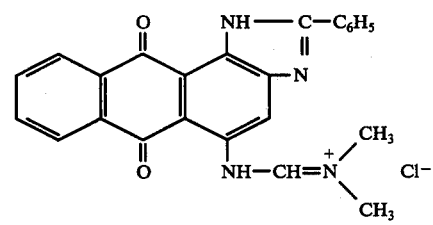

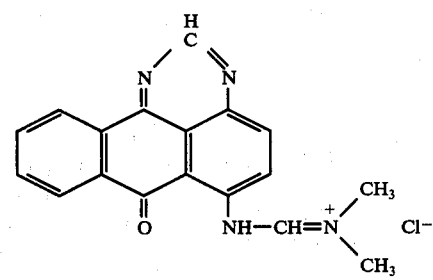

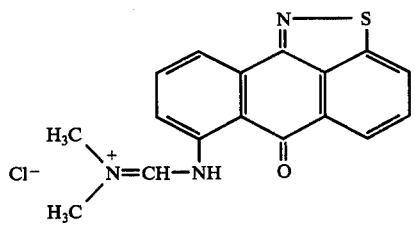

The dyestuffs obtained according to the invention can also be nitrated by applying conventional methods. e.g. nitration with a mixture of nitric acid and sulphuric acid.

It is also possible to sulphonate the dyestuffs obtained according to the invention by likewise employing conventional methods, e.g. treatment with concentrated sulphuric acid or with oleum (H₂SO₄+SO₃).

The new dyestuffs are suitable for dyeing semi-synthetic and fully synthetic fibres, for example acrylic or acrylonitrile fibres, polyacrylonitrile fibres and co-polymers from acrylonitrile and other vinyl compounds, such as acrylic esters, acrylic amides, vinyl pyridine, vinyl chloride, or vinylidene chloride copolymers of dicyanoethylene and vinyl acetate, and of acrylonitrile block co-polymers, fibres of polyurethane, polyolefins, such as basically modified polypropylene, polypropylene modified with nickel or unmodified polypropylene, cellulose triacetate and cellulose 2½-acetate, and especially fibres of polyamides, such as nylon-6, nylon-6.6 or nylon-12, and of aromatic polyesters, such as those from terephthalic acid and ethylene glycol or 1,4-dimethylolcyclohexane and co-polymers of terephthalic acid and isoterephthalic acid with ethylene glycol.

The dyeing of the above mentioned fibre materials with the dyestuffs according to the invention that are sparingly soluble in water, is carried out preferably from aqueous dispersion. It is appropriate, therefore, to finely divide the representatives suitable for use as disperse dyestuffs by grinding them with textile auxiliaries such, for example, as dispersants, and possibly with other grinding auxiliaries. By subsequent drying, dyestuff preparations are obtained consisting of textile auxiliary and the dyestuff.

Examples of dispersants of the non-ionic group that can be used with advantage are: addition products of 8 mols of ethylene oxide with 1 mol of p-tert.-octylphenol, of 15 resp. 6 mols of ethylene oxide with castor oil, of 20 mols of ethylene oxide with the alcohol C₁₆H₃₃OH, ethylene oxide addition products with di-[α-phenylethyl]-phenols, polyethylene oxide-tert.-dodecyl-thioether, polyamine-polyglycol ether or addition products of 15 resp. 30 mols of ethylene oxide with 1 mol of the amine C₁₂H₂₅NH₂ or C₁₈H₃₇—NH₂.

As anionic dispersants there may be mentioned: sulphuric acid esters of alcohols of the fatty series having 8 to 20 carbon atoms, of the ethyleneoxy adducts of the corresponding fatty acid amides, or of alkylated phenols having 8 to 12 carbon atoms in the alkyl radical; sulphonic acid esters with alkyl radicals having 8 to 20 carbon atoms; sulphation products of unsaturated fats and oils; phosphoric acid esters having 8 to 20 carbon atoms; fatty acid soaps, also alkylaryl sulphonates, condensation products of formaldehyde with naphthalenesulphonic acid and lignin sulphonate.

Suitable cationic dispersants are quaternary ammonium compounds that contain alkyl or aralkyl radicals having 8 to 20 carbon atoms.

In addition to the dispersants, the dyestuff preparations can contain organic solvents, especially solvents that boil above 100° C, which are preferably miscible with water, such as mono- and dialkylglycol ether, dioxane, dimethylformamide or dimethylacetamide, tetramethylenesulphone or dimethylsulphoxide. Dyestuff, dispersant and solvent can with advantage be ground with one another.

The polyester fibres are dyed from aqueous dispersion with the dyestuffs according to the invention, which are sparingly soluble in water, according to the conventional processes for polyester materials. Polyesters of aromatic polycarboxylic acids with polyfunctional alcohols are dyed preferably at temperatures of over 100° C under pressure. However, the dyeing can also be carried out at the boiling point of the dye bath in the presence of dyestuff carriers, for example phenylphenols, polychlorobenzene compounds or similar assistants, or according to the thermosol process, that is to say padding with subsequent after-treatment with the application of heat, for example thermosetting, at 180°–210° C. Cellulose 2½-acetate fibres are dyed preferably at temperatures of 80°–85° C. whereas cellulose triacetate fibres are dyed advantageously at the boiling point of the dye bath. The use of dyestuff carriers is superfluous in dyeing cellulose 2½-acetate or polyamide fibres. The dyestuffs according to the invention can also be used for printing the materials mentioned according to conventional methods.

The dyeings obtained according to the instant process can be subjected to an after-treatment, for example by heating with an aqueous solution of an ion-free detergent.

According to the process of the present invention, the cited compounds can also be applied by printing instead of by impregnating. To this end, a printing ink, for example, is used which contains the finely dispersed dyestuff in addition to the usual auxiliaries used in the printing industry, such as wetting agents and binders.

Furthermore, it is possible to dye, for example, synthetic fibres, such as polyesters and polyamides in organic solvent liquors, such as a mixture of perchloroethylene and dimethylformamide or in pure perchloroethylene.

According to the process of the present invention, deep dyeings and prints possessing good fastness properties are obtained, especially good fastness to light, thermosetting, sublimation, pleating, exhaust gas, cross-dyeing, dry-cleaning, ironing, rubbing, chlorine, and good wet fastness properties, for example fastness to water, washing and perspiration.

It is also possible to use the new water-insoluble dyestuffs for the spin dyeings of polyamides, polyesters and polyolefines. The polymers to be dyed are appropriately in the form of powder, grains or chips, as ready prepared spinning solution or mixed in the fused state with the dyestuff, which is introduced in the dry state or in the form of a dispersion or solution in an optionally volatile solvent. After the dyestuff has been uniformly distributed in the solution or the melt of the polymer, the mixture is processed in known manner by pouring, moulding or extruding to fibres, yarns, monofilaments, films and the like.

The representatives of the new dyestuffs which contain sulphonic acid groups can be used in conventional manner for dyeing nitrogen-containing materials such as leather, silk, polyurethane fibres and, in particular, for dyeing wool and synthetic polyamide fibres (nylon 6 or polycaprolactam, nylon 66 or poly[hexamethylenediamine adipic acid diamide] and others), for which purpose the dyestuffs are applied in weakly acid aqueous liquor with the application of heat. The customary assistants can be used in this procedure, e.g. levelling agents with polyethylene oxide chains.

The following Examples illustrate the invention, the parts and percentages being by weight unless otherwise stated.

EXAMPLE 1

At room temperature, 3 parts by volume of N-formyl-N-methylaniline and 3 parts by volume of thionyl chloride are added dropwise in succession to a suspension of 2.7 parts of 2-cyano-3-aminobenanthrone in 70 parts by volume of chlorobenzene. The mixture is then stirred for 2 hours at 60° C in the process of which a dense precipitate is formed. The batch is cooled to room temperature, and the precipitate is collected by suction filtration and washed with benzene. The residue is dried and then put into a 10% ammonia solution. The resulting dyestuff of the following constitution is collected by suction filtration and dried. Recrystallisation from ethanol yields 2.7 parts of brown crystals.

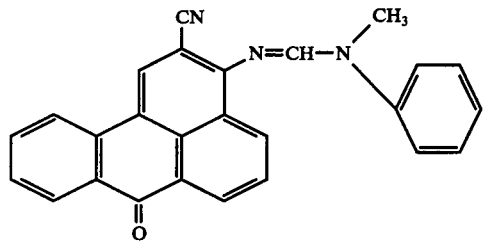

The dyestuff dyes polyester yellow with good fastness to light and sublimation.

Manufacture of 2-cyano-3-amino-benzanthrone 927 parts of anthracene-9-aldehyde are suspended in 4.2 liters of ethanol. The suspension is treated with 10 parts by volume of piperidine and at about 45° C over the course of 1 hour with 310 parts of malonic acid dinitrile in 400 parts by volume of ethanol.

The orange suspension is stirred for 2 hours at 70° C and subsequently cooled to 5°–10° C. The suspension is filtered with suction and the residue is washed with 500 parts by volume of ethanol and dried in vacuo at 90°–100° C to yield 1077 parts of the intermediate of the formula

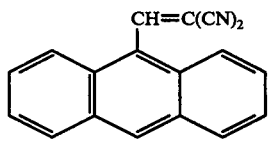

254 parts of the resulting intermediate are finely suspended in 1.75 liters of dry benzene. At room temperature, 320 parts of anhydrous aluminium chloride are added thereto over the course of about 2 hours. The green suspension is heated to 80° C over the course of 45 minutes, stirred for 15 minutes at this temperature and then allowed to cool to 10° C. The benzene is decanted off from the viscous mass and the residue is poured onto 7 kg of ice. The aqueous suspension is stirred for 8 hours at room temperature. The suspension is filtered off and the residue is washed neutral with about 2 liters of water and dried in vacuo at 105° C to yield 254 parts of 2-cyano-3-aminobenzanthrone. The compounds of the formula

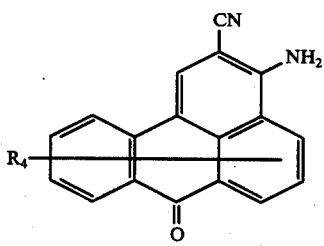

wherein $R_4$ represents a halogen atom, a lower alkyl group or hydrogen, are ordinarily accessible by reaction of the vinylidene compounds of the formula

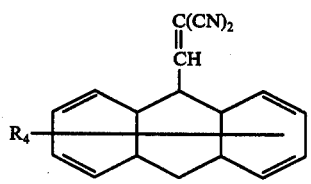

with Friedel-Crafts reagents, wherein treatment is effected in inert solvents such as benzene, nitrobenzene or carbon disulphide at −20° C to 150° C, preferably at 0° C to 100° C, with ferric trichloride, boron trifluoride, boron trifluoride etherate or preferably aluminium chloride, and processing is carried out in the conventional manner.

EXAMPLE 2

3 parts by volume of phosphoroxy chloride are added dropwise to a suspension of 2.7 parts of 2-cyano-3-aminobenzanthrone in 10 parts by volume of N,N-diethylbutyric acid amide. The mixture is then stirred for 80 minutes at 60° C, cooled, and treated with 100 parts by volume of benzene. The resulting precipitate is filtered off with suction, washed with benzene and dried. The amidine hydrochloride is given to a 10% ammonia solution, and the mixture is thoroughly stirred, then filtered with suction and the residue is dried. Recrystallisation from ethanol yields 2.2 parts of dyestuff (melting point 170° C) of the formula

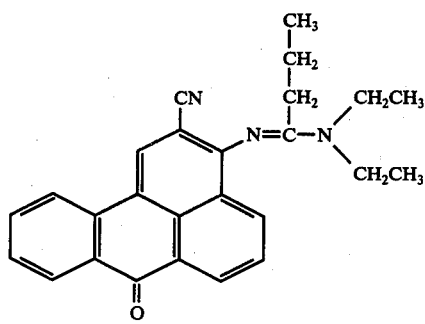

which dyes polyester fibres golden yellow with good light fastness.

EXAMPLE 3

3 parts by volume of phosphoroxy trichloride are added dropwise at room temperature to a suspension of 4.1 parts of 2-cyano-3-aminobenzanthrone in 15 parts by volume of phenylacetic acid diethyl amide. The mixture is then heated to 60° C, stirred for 80 minutes at this temperature, then cooled, treated with 80 parts by volume of benzene and the resulting crystalline precipitate is filtered off with suction. The precipitate is washed with benzene and then dried by suction. The residue is given to 100 parts by volume of 10% ammonia solution, the mixture is thoroughly stirred and filtered with suction. Recrystallisation from ethanol yields 4.4 parts of dark crystals which melt at 212° C and constitute the dyestuff of the formula

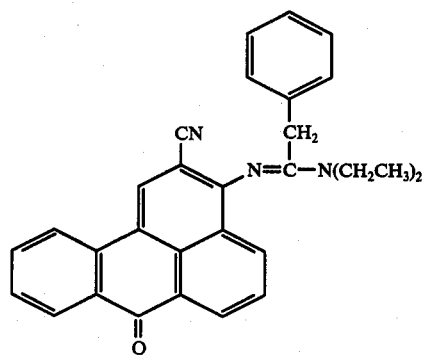

The dyestuff dyes polyester golden yellow with good fastness to light and sublimation.

EXAMPLE 4

6 parts by volume of phosphoroxy trichloride are added dropwise at room temperature to a suspension of 5.4 parts of 2-cyano-3-aminobenzanthrone in 20 parts by volume of N-methylpyridone. The mixture is subsequently stirred for 1 hour at 35° C, then treated with 100 parts by volume of benzene and subsequently filtered with suction. The residue is washed with benzene and dried. The greenish amidine hydrochloride is given to 100 parts by volume of 10% ammonia, the mixture is thoroughly stirred, filtered with suction and the residue is washed with water, Recrystallisation from ethanol yields 5.4 parts of a light brown powder which melts at 233°–234° C and has the formula

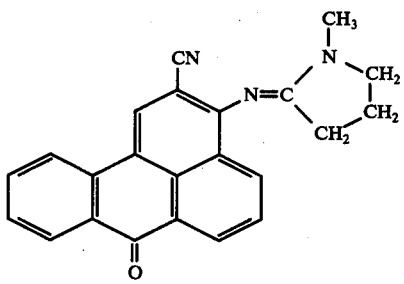

The dyestuff dyes polyester fibres golden yellow with good fastness to light.

EXAMPLE 5

0.9 part of 1-formyl-1,2,3,4-tetrahydroquinoline is added at room temperature to 1.4 parts of 2-cyano-3- aminobenzanthrone in 40 parts by volume of thionyl chloride. The mixture is stirred for 2 hours, then filtered off at room temperature and the residue is washed with benzene. The dried residue is given to 10% ammonia solution, the mixture is thoroughly stirred, filtered with suction and the residue is dried, yielding 1.7 parts of a dyestuff of the formula

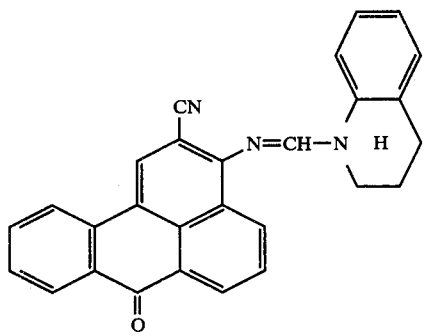

which dyes polyester fibres yellow with very good fastness to light.

EXAMPLE 6

1.3 parts of 1-formyl-2,2,4,7-tetramethyl-1,2,3,4-tetrahydroquinoline are added at room temperature to 1.4 parts of 2-cyano-3-aminobenzanthrone in 40 parts by volume of thionyl chloride, and the procedure as described in Example 5 is carried out. Yield: 2.4 parts of a dyestuff of the formula

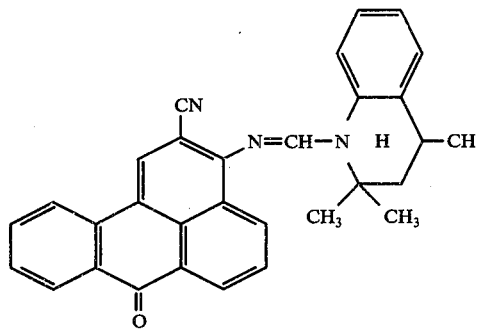

which dyes polyester fibres yellow with good fastness to light.

EXAMPLE 7

1.1 parts of 1-formyl-2,3,3-trimethylindoline are added at room temperature to 1.4 parts of 2-cyano-3-aminobenzanthrone in 40 parts by volume of thionyl chloride. The procedure as described in Example 5 is carried out. Yield: 2.2 parts of a dyestuff of the formula

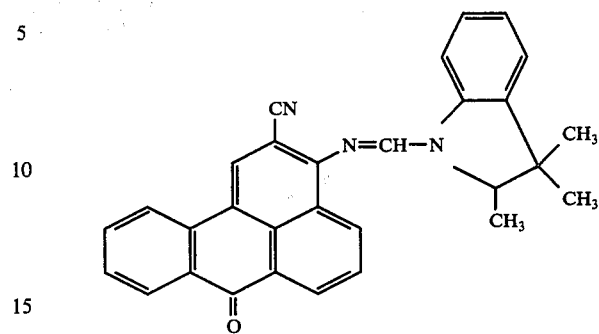

which dyes polyester fibres yellow with good fastness to light.

EXAMPLE 8

4 parts by volume of thionyl chloride are added dropwise to a suspension of 3.0 parts of 2-carboxy-3-aminobenzanthrone in 50 parts by volume of benzene and 3 parts by volume of dimethyl formamide. The mixture is stirred for 1 hour at 60° C. The resulting greenish precipitate is filtered with suction and washed with benzene. The residue is given to a solution of 100 parts by volume of benzene and 10 parts by volume of piperidine. The liquor is stirred for 1 hour at room temperature, then filtered with suction and the residue is washed with benzene. The filtrate is concentrated in vacuo to dryness. Recrystallisation of the residue from methanol yields 2.3 parts of brown crystals of the formula

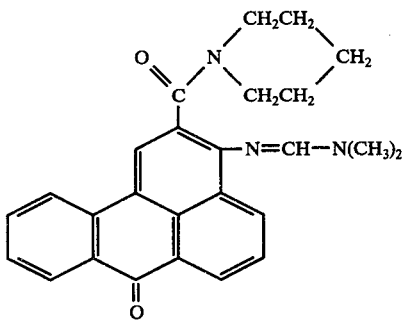

The dyestuff dyes polyester fibres golden yellow with good fastness to light and sublimation. The following Table lists dyestuffs which are manufactured in exactly analogous manner and whose shade on polyester fibres is indicated in the last column.

TABLE 1

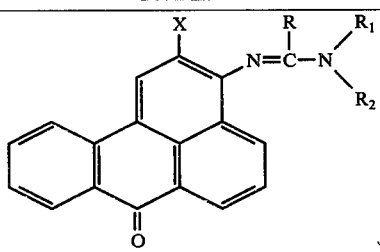

| No. | X | R | $R_1$ | $R_2$ | Shade on polyester |
|---|---|---|---|---|---|
| 1 | CN | H | $CH_3$ | $CH_3$ | greenish yellow |

TABLE 1-continued

| No. | X | R | $R_1$ | $R_2$ | Shade on polyester |
|---|---|---|---|---|---|
| 2 | CN | H | —CH$_2$—CH$_2$—O—CH$_2$—CH$_2$— | | " |
| 3 | CN | H | C$_6$H$_5$ | C$_6$H$_5$ | " |
| 4 | CN | H | CH$_2$CH$_3$ | CH$_2$CH$_3$ | " |
| 5 | CN | H | CH$_2$CH$_2$CH$_2$CH$_3$ | CH$_2$CH$_2$CH$_2$CH$_3$ | " |
| 6 | CN | H | CH$_3$ | C$_6$H$_5$ | " |
| 7 | CN | H | CH$_2$C$_6$H$_5$ | CH$_2$C$_6$H$_5$ | " |
| 8 | CN | H | Octyl | CH$_2$C$_6$H$_5$ | " |
| 9 | CN | H | CH$_2$C$_6$H$_5$ | C$_6$H$_5$ | " |
| 10 | CN | H | CH$_3$ | CH$_2$CH$_2$Cl | yellow |
| 11 | CN | H | C$_6$H$_5$ | CH$_2$CH$_2$CN | " |
| 12 | CN | H | CH$_2$CH$_2$CN | CH$_2$CH$_2$CN | " |
| 13 | CN | H | CH$_2$C$_6$H$_5$ | CH$_2$CH$_2$CN | " |
| 14 | CN | CH$_2$CH$_3$ | CH$_2$C$_6$H$_5$ | CH$_2$CH$_2$CN | " |
| 15 | CN | CH$_2$CH$_2$CH$_3$ | CH$_2$CH$_3$ | CH$_2$CH$_3$ | golden yellow |
| 16 | CN | CH$_2$CH$_3$ | CH$_2$C$_6$H$_5$ | CH$_2$C$_6$H$_5$ | " |
| 17 | CN | CH$_2$CH$_2$CH$_3$ | CH$_2$C$_6$H$_5$ | CH$_2$C$_6$H$_5$ | " |
| 18 | CN | CH$_3$ | CH$_2$C$_6$H$_5$ | CH$_2$C$_6$H$_5$ | " |
| 19 | H | H | CH$_3$ | CH$_3$ | " |
| 20 | H | H | CH$_3$ | C$_6$H$_5$ | " |
| 21 | H | H | H | CH$_3$ | " |
| 22 | H | H | —CH$_2$—CH$_2$—O—CH$_2$—CH$_2$— | | " |
| 23 | O=C—N(C$_2$H$_5$)$_2$ | H | —CH$_2$—CH$_2$—O—CH$_2$—CH$_2$— | | " |
| 24 | O=C—N(CH$_3$)(C$_6$H$_5$) | H | CH$_3$ | CH$_3$ | " |
| 25 | O=C—C[CH(CH$_3$)$_2$]$_2$ | H | CH$_3$ | CH$_3$ | " |
| 26 | O=C—N(C$_2$H$_5$)$_2$ | H | CH$_3$ | CH$_3$ | " |
| 27 | O=C—N(But)$_2$ | H | CH$_2$CH$_2$CH$_2$CH$_3$ | CH$_2$CH$_2$CH$_2$CH$_3$ | " |
| 28 | O=C—N(But)$_2$ | CH$_2$CH$_3$ | CH$_2$CH$_3$ | CH$_2$CH$_3$ | " |
| 29 | O=C—N(C$_2$H$_5$)$_2$ | H | CH$_2$CH$_2$CN | CH$_2$CH$_2$CN | " |
| 30 | O=C—N(C$_2$H$_5$)$_2$ | H | CH$_2$C$_6$H$_5$ | CH$_2$CH$_2$CN | " |
| 31 | O=C—OC$_2$H$_5$ | H | CH$_3$ | CH$_3$ | " |
| 32 | O=C—OC$_2$H$_5$ | H | CH$_2$CH$_2$CN | CH$_2$CH$_2$CN | " |
| 33 | O=C—OC$_2$H$_5$ | H | CH$_2$CH$_2$CH$_2$CH$_3$ | CH$_2$CH$_2$CH$_2$CH$_3$ | " |
| 34 | 2-benzimidazolyl | H | CH$_2$CH$_2$CH$_2$CH$_3$ | CH$_2$CH$_2$CH$_2$CH$_3$ | " |
| 35 | 2-benzoxazolyl | H | CH$_3$ | CH$_3$ | " |
| 36 | CN | H | —CH$_2$—CH$_2$—CH$_2$—CH$_2$—CH$_2$— | | yellow |
| 37 | " | CH$_3$ | —CH$_2$—CH$_2$—O—CH$_2$—CH$_2$— | | golden yellow |
| 38 | " | C$_2$H$_5$ | C$_2$H$_5$ | C$_2$H$_5$ | " |
| 39 | " | CH$_2$—C$_6$H$_5$ | " | " | " |
| 40 | " | " | C$_3$H$_7$ | C$_3$H$_7$ | " |

TABLE 1-continued

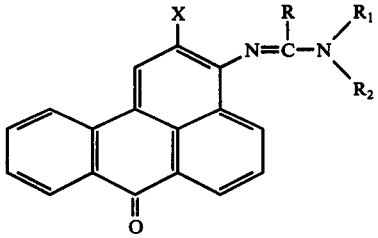

| No. | X | R | $R_1$ | $R_2$ | Shade on polyester |
|---|---|---|---|---|---|
| 41 | " | " | $C_4H_9$ | $C_4H_9$ | " |
| 42 | " | $C_3H_7$ | " | " | " |
| 43 | " | " | $C_3H_7$ | $CH_2-C_6H_5$ | " |
| 44 | " | H | " | $-CH_2CH_2-C_6H_5$ | yellow |
| 45 | " | " | $C_4H_9$ | $-CH_2-C_6H_5$ | " |
| 46 | " | " | $C_2H_5$ | $C_6H_5$ | " |
| 47 | " | " | $C_3H_7$ | " | " |
| 48 | " | " | $C_4H_9$ | " | " |
| 49 | " | " | $C_2H_5$ | p-Cl—$C_6H_4$ | " |
| 50 | " | " | " | m-Cl$C_6H_4$ | " |
| 51 | " | " | " | o-Cl$C_6H_4$ | " |
| 52 | " | " | " | p-$CH_3C_6H_4$ | " |
| 53 | " | " | " | m-$CH_3C_6H_4$ | " |
| 54 | " | " | " | o-$CH_3C_6H_4$ | " |

EXAMPLE 9

5 parts by volume of phosphoroxy chloride are added dropwise to a suspension of 2.7 parts of 2-cyano-3-amino-benzanthrone and 2.7 parts of acetanilide in 50 parts by volume of toluene. The mixture is stirred at 100° C for 30 minutes, then cooled, filtered, and the product is washed with toluene. The residue is given to 10% ammonia solution, thoroughly stirred filtered with suction and dried. Recrystallisation from dimethyl formamide yields 1.8 parts of a dyestuff of the formula

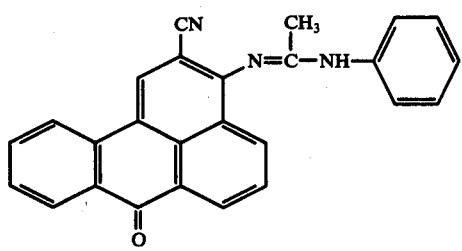

which dyes polyester fibres greenish yellow. The dyestuffs listed in the following Table 1a of the general formula

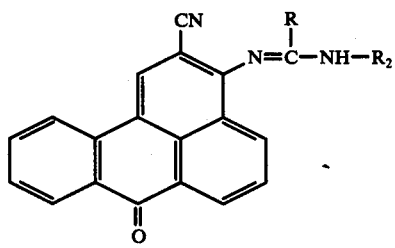

are obtained in analogous manner.

TABLE 1a

| No. | R | $R_2$ | Shade on polyester |
|---|---|---|---|
| 1 | $C_2H_5$ | $-C_6H_5$ | greenish yellow |
| 2 | $C_3H_7$ | $-C_6H_5$ | greenish yellow |
| 3 | $C_2H_5$ | $-CH_2-C_6H_5$ | greenish yellow |

EXAMPLE 10

3 parts by volume of thionyl chloride are added dropwise to a suspension of 2.7 parts of 4-amino-N-butyl-naphthalic acid imide in 50 parts by volume of benzene and 3 parts of N-formyl-dibutylamine. The mixture is stirred for 2 hours at 50° C, then cooled, filtered with suction and the product is washed with benzene. The residue is given to 100 parts of 10% ammonia solution, the mixture is stirred, filtered with suction and the product is washed with water. Recrystallisation from ethanol yields 2.6 parts of yellow crystals of the formula

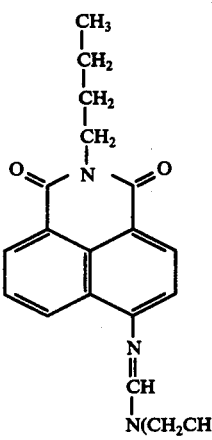

The dyestuff dyes polyester fibres greenish yellow with good fastness to light.

EXAMPLE 11

3 parts by volume of thionyl chloride are added dropwise to a suspension of 3 parts of 4-amino-N-benzyl-naphthalic acid imide in 50 parts of benzene and 3 parts of N-formyl-dibutylamine. The mixture is stirred for 2 hours at 50° C, then cooled, filtered with suction, and the product is washed with benzene. The residue is given to 100 parts by volume of 10% ammonia solution, the mixture is stirred, filtered with suction, and the product is washed with water. Recrystallisation from ethanol yields 3.1 parts of yellow powder of the formula

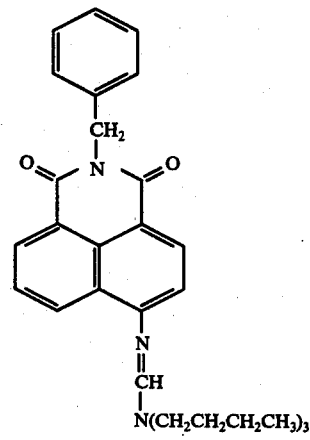

The dyestuff dyes polyester fibres greenish yellow with good fastness to light and sublimation. The dyestuffs listed in the following Table 2 are obtained in precisely analogous manner. They dye polyester fibres in greenish yellow shades.

TABLE 2

| No. | X | R | $R_1$ | $R_2$ |
|---|---|---|---|---|
| 1 | $CH_2CH_3$ | H | $CH_2CH_3$ | $CH_2CH_3$ |
| 2 | $CH_2CH_3$ | H | $CH_2CH_2CH_2CH_3$ | $CH_2CH_2CH_2CH_3$ |
| 3 | $CH_2CH_3$ | H | $CH_2CH_2CH_2CH_3$ | $CH_2$—C$_6$H$_5$ |
| 4 | $CH_2CH_3$ | H | $CH_2CH_2CH_2CH_3$ | C$_6$H$_5$ |
| 5 | $CH_2CH_3$ | H | $CH_2$—C$_6$H$_5$ | $CH_2$—C$_6$H$_5$ |
| 6 | $CH_2CH_2CH_2CH_3$ | H | $CH_2CH_3$ | $CH_2CH_3$ |
| 7 | $CH_2CH_2CH_2CH_3$ | H | $CH_2CH_2CH_2CH_3$ | $CH_2$—C$_6$H$_5$ |
| 8 | $CH_2CH_2CH_2CH_3$ | H | $CH_2CH_2CH_2CH_3$ | C$_6$H$_5$ |
| 9 | $CH_2CH_2CH_2CH_3$ | H | $CH_2$—C$_6$H$_5$ | $CH_2$—C$_6$H$_5$ |
| 10 | $CH_2CH_2CN$ | H | $CH_2CH_3$ | $CH_2CH_3$ |
| 11 | $CH_2CH_2CN$ | H | $CH_2CH_2CH_2CH_3$ | $CH_2CH_2CH_2CH_3$ |
| 12 | $CH_2CH_2CN$ | H | $CH_2CH_2CH_2CH_3$ | $CH_2$—C$_6$H$_5$ |
| 13 | $CH_2CH_2CN$ | H | $CH_2CH_2CH_2CH_3$ | C$_6$H$_5$ |

TABLE 2-continued

| No. | X | R | R₁ | R₂ |
|---|---|---|---|---|
| 14 | CH₂CH₂CN | H | CH₂—C₆H₅ | CH₂—C₆H₅ |
| 15 | CH₂CH₂CH₂OCH₃ | H | CH₂CH₃ | CH₂CH₃ |
| 16 | CH₂CH₂CH₂OCH₃ | H | CH₂CH₂CH₃ | CH₂CH₂CH₃ |
| 17 | CH₂CH₂CH₂OCH₃ | H | CH₂CH₂CH₃ | CH₂—C₆H₅ |
| 18 | CH₂CH₂CH₂OCH₃ | H | CH₂CH₂CH₃ | C₆H₅ |
| 19 | CH₂CH₂CH₂OCH₃ | H | CH₂—C₆H₅ | CH₂—C₆H₅ |
| 20 | 4-Cl-C₆H₄— | " | —C₃H₇ | —CH₂—C₆H₅ |
| 21 | 4-Br-C₆H₄— | " | " | " |
| 22 | 3-Cl-4-Br-C₆H₃— | " | —C₄H₉ | —C₄H₉ |
| 23 | " | " | —C₃H₇ | —CH₂—C₆H₅ |
| 24 | " | " | —C₄H₉ | —CH₂—C₆H₅ |
| 25 | CH₂—C₆H₅ | CH₂CH₃ | CH₂—C₆H₅ | CH₂—C₆H₅ |
| 26 | CH₂—C₆H₅ | H | CH₂—C₆H₅ | CH₂—C₆H₅ |
| 27 | CH₂—C₆H₅ | H | CH₃ | CH₂—C₆H₅ |
| 28 | CH₂—C₆H₅ | H | CH₂CH₂CH₃ | C₆H₅ |
| 29 | CH₂—C₆H₅ | H | CH₂CH₃ | C₆H₅ |
| 30 | CH₂—C₆H₅ | H | Octyl | CH₂—C₆H₅ |
| 31 | CH₂—C₆H₅ | H | —CH(CH₃)₂ | CH₂—C₆H₅ |
| 32 | CH₂CH₂—C₆H₅ | H | —CH(CH₃)₂ | CH₂—C₆H₅ |
| 33 | CH₂—C₆H₅ | H | CH₂CH₂CH₂CH₃ | CH₂—C₆H₅ |

TABLE 2-continued

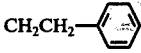

| No. | X | R | $R_1$ | $R_2$ |
|---|---|---|---|---|
| 34 | CH₂CH₂—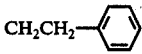 | H | CH₂CH₃ | CH₂CH₃ |
| 35 | CH₂CH₂—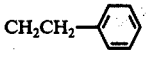 | H | CH₂CH₂CH₃ | CH₂CH₂CH₂CH₃ |
| 36 | CH₂CH₂—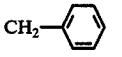 | H | CH₂CH₂CH₃ | CH₂—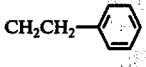 |
| 37 | CH₂CH₂— | H | CH₂CH₂CH₃ | 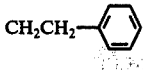 |
| 38 | CH₂CH₂—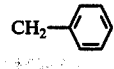 | H | CH₂—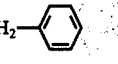 | CH₂—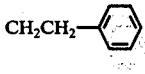 |
| 39 | CH₂CH₂—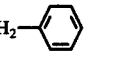 | CH₂CH₃ | CH₂CH₃ | CH₂—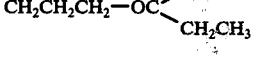 |
| 40 | CH₂CH₂CH₂—OC(=O)CH₂CH₃ | H | CH₂CH₃ | CH₂CH₃ |
| 41 | " | H | CH₂CH₂CH₃ | CH₂CH₂CH₂CH₃ |
| 42 | CH₂CH₂CH₂OC(=O)CH₂CH₃ | H | CH₂CH₂CH₃ | CH₂— |
| 43 | " | H | CH₂CH₂CH₃ | 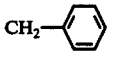 |
| 44 | " | H | CH₂— | CH₂—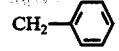 |
| 45 | " | CH₂CH₃ | CH₂CH₃ | CH₂—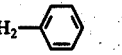 |
| 46 | CH₂CH₂CH₂C(=O)OCH₂CH₃ | H | CH₂CH₃ | CH₂CH₃ |
| 47 | " | H | CH₂CH₂CH₃ | CH₂CH₂CH₂CH₃ |
| 48 | " | H | CH₂CH₂CH₃ | CH₂—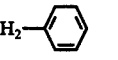 |
| 49 | " | H | CH₂CH₂CH₃ | 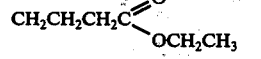 |
| 50 | " | H | CH₂—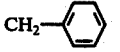 | CH₂— |
| 51 | " | CH₂CH₃ | CH₂CH₃ | CH₂—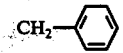 |
| 52 | CH₂CH₂CH₂SCH₃ | H | CH₂CH₃ | CH₂CH₃ |
| 53 | " | H | CH₂CH₂CH₃ | CH₂CH₂CH₂CH₃ |

TABLE 2-continued

| No. | X | R | R₁ | R₂ |
|---|---|---|---|---|
| 54 | " | H | " | CH₂—C₆H₅ |
| 55 | " | H | " | C₆H₅ |
| 56 | " | H | CH₂—C₆H₅ | CH₂—C₆H₅ |
| 57 | " | CH₂CH₃ | CH₂CH₃ | CH₂—C₆H₅ |
| 58 | —C₆H₅ | H | CH₂CH₃ | CH₂CH₃ |
| 59 | " | H | CH₂CH₂CH₂CH₃ | CH₂CH₂CH₂CH₃ |
| 60 | " | H | " | CH₂—C₆H₅ |
| 61 | " | H | " | C₆H₅ |
| 62 | " | H | CH₂—C₆H₅ | CH₂—C₆H₅ |
| 63 | " | CH₂CH₃ | CH₂CH₃ | CH₂—C₆H₅ |
| 64 | —C₆H₄—CH₃ | H | CH₂—C₆H₅ | CH₂—C₆H₅ |
| 65 | " | CH₂CH₃ | CH₂—C₆H₅ | CH₂—C₆H₅ |
| 66 | —C₆H₄—CH₃ | H | CH₂CH₃ | CH₂CH₂—C₆H₅ |
| 67 | " | H | CH₂CH₂CH₂CH₃ | CH₂—C₆H₅ |
| 68 | " | H | CH₂CH₂CH₂CH₃ | CH₂CH₂—C₆H₅ |
| 69 | " | H | CH₂CH₂CH₃ | CH₂CH₂—C₆H₅ |
| 70 | " | H | —CH(CH₃)₂ | CH₂—C₆H₅ |
| 71 | " | H | Hexyl | CH₂—C₆H₅ |
| 72 | " | H | CH₂CH₂CH₃ | CH₂—C₆H₅ |

TABLE 2-continued

| No. | X | R | $R_1$ | $R_2$ |
|---|---|---|---|---|
| 73 | 2,4-dimethylphenyl | H | $CH_2CH_2CH_3$ | $CH_2$-phenyl |
| 74 | " | H | $CH_2CH_3$ | $CH_2CH_2$-phenyl |
| 75 | " | H | $-CH(CH_3)_2$ | $CH_2$-phenyl |
| 76 | " | H | $CH_2CH_2CH_2CH_3$ | $CH_2$-phenyl |
| 77 | " | H | $CH_2CH_2CH_3$ | $CH_2CH_2$-phenyl |
| 78 | " | $CH_2CH_3$ | $CH_2$-phenyl | $CH_2$-phenyl |
| 79 | " | H | $CH_2CH_2CH_2CH_3$ | $CH_2CH_2CH_2CH_3$ |
| 80 | " | H | $CH_2$-phenyl | $CH_2$-phenyl |
| 81 | 2,4-dimethylphenyl | H | $CH_2$-phenyl | $CH_2$-phenyl |
| 82 | " | H | Hexyl | $CH_2$-phenyl |
| 83 | " | H | $CH_2CH_2CH_2CH_3$ | phenyl |
| 84 | " | H | $CH_2CH_2CH_2CH_3$ | $CH_2$-phenyl |
| 85 | " | H | $CH_2CH_2$-phenyl | $CH_2$-phenyl |
| 86 | " | H | $CH_2CH_2$-phenyl | $CH_2CH_2CH_2CH_3$ |
| 87 | " | H | $CH_2CH_2CH_3$ | $CH_2CH_2$-phenyl |
| 88 | " | H | $CH_2CH_3$ | $CH_2CH_2$-phenyl |
| 89 | 2,4-dimethylphenyl | $CH_2CH_3$ | $CH_2CH_3$ | $CH_2$-phenyl |

TABLE 2-continued

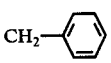

| No. | X | R | R₁ | R₂ |
|---|---|---|---|---|
| 90 | " | $CH_2$—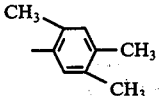 | $CH_2CH_3$ | $CH_2CH_3$ |
| 91 | 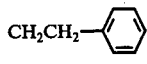 (2,4,5-tri-CH₃ phenyl) | H | $CH_2CH_3$ | $CH_2CH_2$—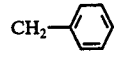 |
| 92 | " | H | $CH_2CH_2CH_3$ | $CH_2$—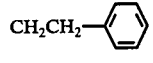 |
| 93 | " | H | $CH_2CH_2CH_3$ | $CH_2CH_2$—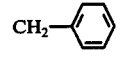 |
| 94 | " | H | $CH_2CH_2CH_3$ | $CH_2$— |
| 95 | " | H | $CH_2CH_2CH_3$ | $CH_2CH_2CH_3$ |
| 96 | " | H | $CH_2CH_2CH_3$ | 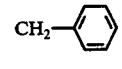 |
| 97 | " | $CH_2CH_3$ | $CH_2CH_3$ | $CH_2$—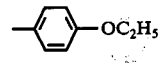 |
| 98 | 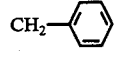 (4-OC₂H₅ phenyl) | H | $CH_2CH_2CH_3$ | $CH_2CH_2CH_3$ |
| 99 | " | H | $CH_2$—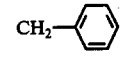 | $CH_2$—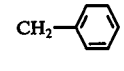 |
| 100 | " | H | $CH_2CH_2CH_3$ | $CH_2$— |
| 101 | " | H | $CH_2CH_2CH_3$ | 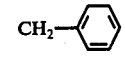 |
| 102 | " | $CH_2CH_3$ | $CH_2CH_3$ | $CH_2$—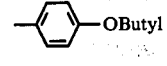 |
| 103 |  (4-OButyl phenyl) | H | —CH(CH₃)₂ | $CH_2$—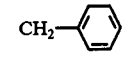 |
| 104 | " | H | $CH_2CH_2CH_3$ | $CH_2CH_2CH_3$ |
| 105 | " | $CH_2CH_3$ | $CH_2CH_3$ | $CH_2$—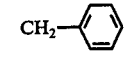 |
| 106 | 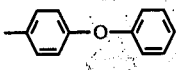 (4-phenoxy phenyl) | H | $CH_2CH_2CH_3$ | $CH_2CH_2CH_3$ |
| 107 | " | H | $CH_2CH_2CH_3$ | $CH_2$—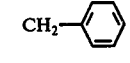 |

TABLE 2-continued

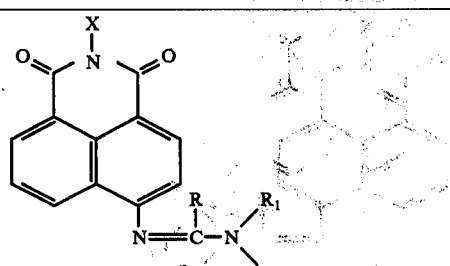

| No. | X | R | R₁ | R₂ |
|---|---|---|---|---|
| 108 | " | H | $CH_2CH_2CH_2CH_3$ | phenyl |
| 109 | " | $CH_2CH_3$ | $CH_2CH_3$ | $CH_2$-phenyl |
| 110 | 4-($CO_2C_2H_5$)-phenyl | H | $CH_2CH_2CH_2CH_3$ | $CH_2CH_2CH_2CH_3$ |
| 111 | " | H | $CH_2CH_2CH_2CH_3$ | $CH_2$-phenyl |
| 112 | " | H | $CH_2CH_2CH_2CH_3$ | phenyl |
| 113 | " | $CH_2CH_3$ | $CH_2CH_3$ | $CH_2$-phenyl |
| 114 | 4-($CON(C_2H_5)_2$)-phenyl | H | $CH_2CH_2CH_2CH_3$ | $CH_2CH_2CH_2CH_3$ |
| 115 | " | H | $CH_2CH_2CH_2CH_3$ | $CH_2$-phenyl |
| 116 | " | H | $CH_2CH_2CH_2CH_3$ | phenyl |
| 117 | " | $CH_2CH_3$ | $CH_2CH_3$ | $CH_2$-phenyl |
| 118 | 4-($SO_2CH_3$)-phenyl | H | $CH_2CH_2CH_2CH_3$ | $CH_2CH_2CH_2CH_3$ |
| 119 | " | H | $CH_2CH_2CH_2CH_3$ | $CH_2$-phenyl |
| 120 | " | H | $CH_2CH_2CH_2CH_3$ | phenyl |
| 121 | " | $CH_2CH_3$ | $CH_2CH_3$ | $CH_2$-phenyl |
| 122 | 4-($SO_2$-phenyl)-phenyl | H | $CH_2CH_2CH_2CH_3$ | $CH_2CH_2CH_2CH_3$ |
| 123 | " | H | $CH_2CH_2CH_2CH_3$ | $CH_2$-phenyl |
| 124 | " | H | $CH_2CH_2CH_2CH_3$ | phenyl |

TABLE 2-continued

| No. | X | R | R₁ | R₂ |
|---|---|---|---|---|
| 125 | " | $CH_2CH_3$ | $CH_2CH_3$ | $CH_2C_6H_5$ |
| 126 | 4-Cl-C₆H₄- | H | $CH_2CH_2CH_2CH_3$ | $CH_2CH_2CH_2CH_3$ |
| 127 | " | H | $CH_2CH_2CH_2CH_3$ | $CH_2C_6H_5$ |
| 128 | " | H | $CH_2CH_2CH_2CH_3$ | $C_6H_5$ |
| 129 | " | $CH_2CH_3$ | $CH_2CH_3$ | $CH_2C_6H_5$ |
| 130 | 4-Br-C₆H₄- | H | $CH_2CH_2CH_2CH_3$ | $CH_2CH_2CH_2CH_3$ |
| 131 | " | H | $CH_2CH_2CH_2CH_3$ | $CH_2C_6H_5$ |
| 132 | " | H | $CH_2CH_2CH_2CH_3$ | $C_6H_5$ |
| 133 | " | $CH_2CH_3$ | $CH_2CH_3$ | $CH_2C_6H_5$ |
| 134 | 4-CN-C₆H₄- | H | $CH_2CH_2CH_2CH_2$ | $C_6H_5$ |
| 135 | " | H | $CH_2CH_2CH_2CH_3$ | $CH_2C_6H_5$ |
| 136 | $-O-C_2H_5$ | H | " | " |
| 137 | $-O-C_2H_4-CN$ | H | " | " |
| 138 | $-O-C_2H_4-CN$ | $-CH_2-CH_3$ | $-CH_2-CH_3$ | $-CH_2-C_6H_5$ |
| 139 | $-O-CH_2-C_6H_5$ | H | $-CH_2-CH_2-CH_2-CH_3$ | " |
| 140 | $CH_2CH_2CH_2OCH_3$ | H | $-CH_2-CH_2-O-CH_2-CH_2-$ | |
| 141 | $C_4H_9$ | H | $-C_4H_9$ | $-C_4H_9$ |
| 142 | " | $-CH_3$ | $-CH_2-CH_2-O-CH_2-CH_2-$ | |
| 143 | $CH_2-C_6H_5$ | H | $-C_4H_9$ | $-C_4H_9$ |
| 144 | $C_4H_9$ | $C_2H_3-$ | $-C_4H_9$ | $-C_4H_9$ |
| 145 | " | $CH_2-C_6H_5$ | $-C_2H_5$ | $-C_2H_5$ |
| 146 | $CH_2-C_6H_5$ | $-CH_3$ | $-CH_2-C_6H_5$ | $-CH_2-C_6H_5$ |
| 147 | 4-OCH₃-C₆H₁₀- | $-C_3H_7$ | $-CH_2-C_6H_5$ | $-CH_2-C_6H_5$ |
| 148 | $-CH_2-C_6H_5$ | $-CH_3$ | $-CH_2-C_6H_5$ | $-CH_2-C_6H_5$ |
| 149 | " | $-C_2H_5$ | $-C_4H_9$ | $-CH_2-C_6H_5$ |
| 150 | " | H | $-CH_3$ | $-C_6H_5$ |
| 151 | " | " | Hexyl | $-CH_2-C_6H_5$ |
| 152 | $-CH_2-CH_2-C_6H_5$ | " | " | " |

TABLE 2-continued

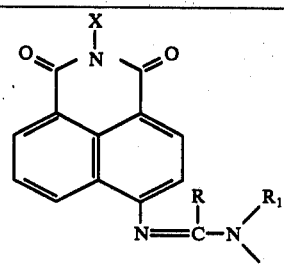

| No. | X | R | R₁ | R₂ |
|-----|---|---|-----|-----|
| 153 | —cyclohexyl-1,2-di-CH₃ | " | —CH(CH₃)₂ | " |
| 154 | " | " | —CH₃ | " |
| 155 | " | " | —C₄H₉ | —CH₂—CH₂—C₆H₅ |
| 156 | " | " | —C₃H₇ | —CH₂—C₆H₅ |
| 157 | —cyclohexyl-CH₃ | " | —CH(CH₃)₂ | " |
| 158 | —cyclohexyl-Cl | H | —CH(CH₃)₂ | —CH₂—C₆H₅ |
| 159 | C₄H₉ | CH₃ | H | —C₆H₅ |
| 160 | " | C₂H₅ | " | " |
| 161 | —cyclohexyl-CH₃ | " | " | " |
| 162 | " | C₃H₇ | " | " |
| 163 | —cyclohexyl-Cl | CH₃ | " | " |
| 164 | " | C₂H₅ | " | " |
| 165 | 3-CH₃O, 4-CH₃, phenyl-SO₂NH₂ | —CH₃ | —CH₂CH₂CH₂CH₃ | —CH₂CH₂CH₂CH₃ |
| 166 | 3-CH₃O, 4-CH₃, phenyl-SO₂NH(CH₂)₃OCH(CH₃)₂ | " | " | " |
| 167 | —C₆H₅ | H | —CH₂—C₆H₅ | —CH₃ |

EXAMPLE 12

3 parts by volume of thionyl chloride are added dropwise to a suspension of 2.9 parts of 4'-aminonaphthoylenebenzimidazole in 50 parts by volume of benzene and 3 parts of N-formyl-dibutylamine. The mixture is stirred for 1 hour at 50° C, then cooled, filtered with suction, and the product is washed with benzene. The residue is given to 100 parts by volume of 10% ammonia solution, the mixture is thoroughly stirred and then filtered with suction. Recrystallisation from ethanol yields 3.2 parts of orange crystals which constitute the dyestuff of the formula

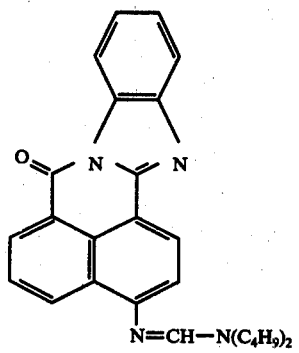

The dyestuff dyes polyester golden yellow with good fastness to light.

EXAMPLE 13

0.9 part of 1-formyl-1,2,3,4-tetrahydroquinoline is added at room temperature to 1.4 parts of a mixture of 4'- and 5'-aminonaphthoylenebenzimidazole in 40 parts by volume of thionyl chloride. After it has been stirred for 4 hours at room temperature the solution is concentrated to dryness in vacuo. The residue is thoroughly stirred with 10% ammonia, collected by suction filtration and dried to yield 2.1 parts of a dyestuff mixture of the formulae

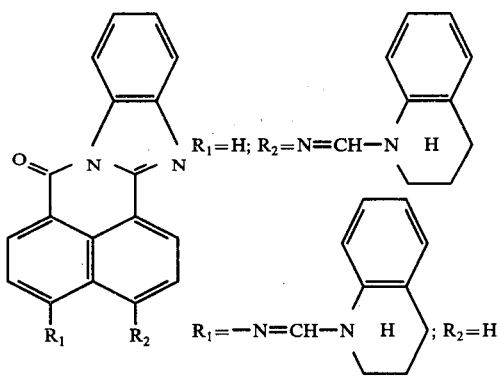

which dyes polyester fibres golden yellow with good fastness to light.

EXAMPLE 14

2.4 parts of 1-formyl-2,2,4,7-tetramethyl-1,2,3,4-tetrahydroquinoline are added at room temperature to 2.8 parts of a mixture of 4'- and 5'-aminonaphthoylenebenzimidazole in 50 parts of thionyl chloride. Further processing is carried out in analogous manner to Example 13, yielding 4.7 parts of a dyestuff mixture of the formulae

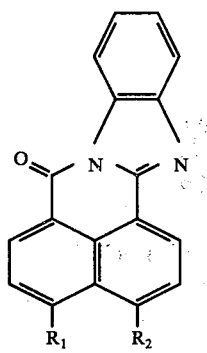

-continued

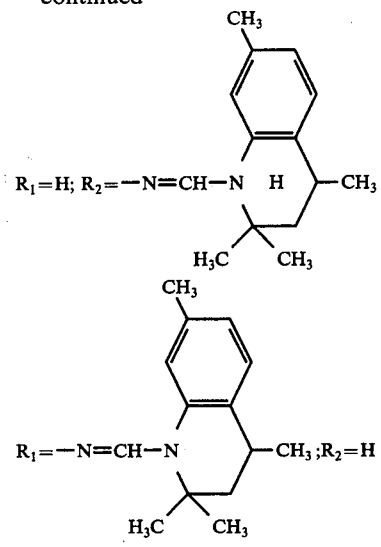

which dyes polyester fibres golden yellow with good fastness to light.

EXAMPLE 15

2.1 parts of 1-formyl-2,3,3-trimethylindoline are added at room temperature to 2.8 parts of a mixture of 4'- and 5'-aminonaphthoylenebenzimidazole in 50 parts by volume of thionyl chloride. The further procedure corresponds to that of Example 1. Yield: 4.5 parts of a dyestuff mixture of the formulae

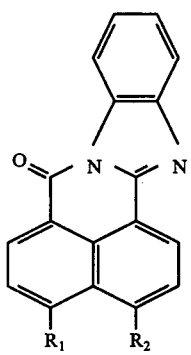

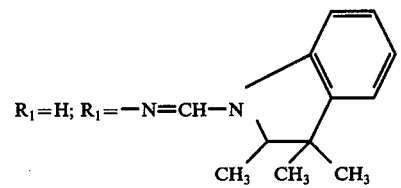

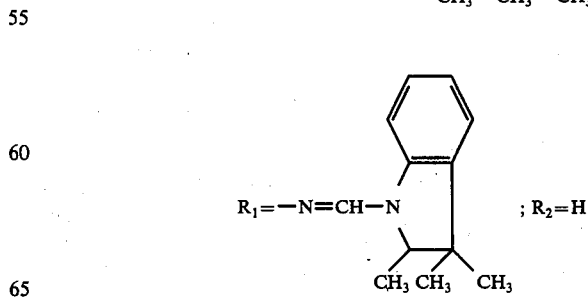

which dyes polyester fibres golden yellow with good fastness to light.

EXAMPLE 16

12.6 parts of a dyestuff of the formula

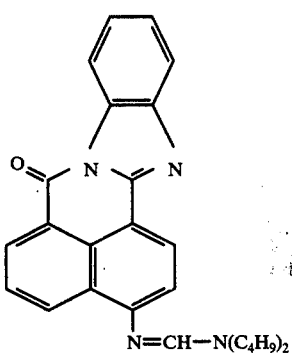

are dissolved in 150 parts by volume of conc. sulphuric acid. This solution is treated slowly at 5°-10° C with a mixture of 1.9 parts of 99% nitric acid in 30 parts by volume of conc. sulphuric acid. The mixture is stirred for 2 hours at room temperature and subsequently poured on ice. The precipitate that forms is collected by suction filtration, washed with water and dried to yield 10.4 parts of a dyestuff which dyes polyester fibres with good fastness to light and has the formula

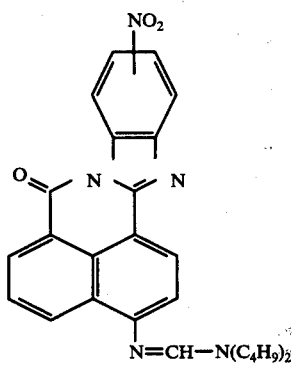

The dyestuff is identical with that listed as No. 32 in Table 3.

EXAMPLE 17

3 parts by volume of thionyl chloride are added dropwise to a suspension of 2.5 parts of 5'-aminonaphthylenebenzimidazole in 50 parts by volume of benzene and 3.0 parts of formyl-dibutylamine. The mixture is stirred for 1 hour at 50° C, then cooled, filtered with suction and the product is washed with benzene. The residue is given to 100 parts by volume of 10% ammonia solution, the mixture is thoroughly stirred and then filtered with suction. Recrystallisation from ethanol yields 2.8 parts of orange crystals (m.p. 172° C) which constitute the dyestuff of the formula

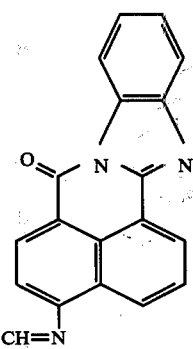

The dyestuff dyes polyester yellow with very good fastness to light and sublimation. The dyestuffs described in the following Table 3 were manufactured in analogous manner.

Table 3

| No. | X | R | $R_1$ | $R_2$ | Shade on polyester |
|---|---|---|---|---|---|
| 1 | (o-phenylene) | H | $CH_2$—Ph | $CH_2$—Ph | golden yellow |
| 2 | " | H | Hexyl | " | " |
| 3 | " | H | —CH(CH$_3$)$_2$ | " | " |
| 4 | " | H | $CH_3$ | " | " |

Table 3-continued
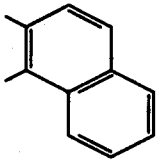
| No. | X | R | R₁ | R₂ | Shade on polyester |
|---|---|---|---|---|---|
| 5 | " | H | CH₃ | 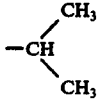 | " |
| 6 | 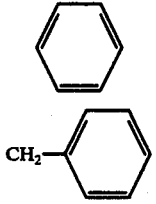 | H | $-CH\begin{smallmatrix}CH_3\\CH_3\end{smallmatrix}$ | 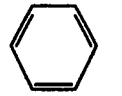CH₂— | orange |
| 7 | " | H | CH₂CH₂CH₂CH₃ | CH₂CH₂CH₂CH₃ | " |
| 8 | " | H | " | 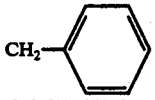 | " |
| 9 | " | H | " | 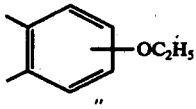CH₂— | " |
| 10 | —OC₂H₅ | H | " | CH₂CH₂CH₂CH₃ | " |
| 11 | " | H | 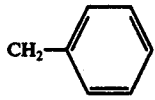CH₂— | 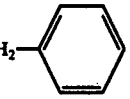CH₂— | " |
| 12 | 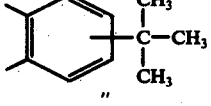—C(CH₃)₃ | H | CH₂CH₂CH₂CH₃ | CH₂CH₂CH₂CH₃ | golden yellow |
| 13 | " | H | " | 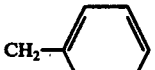 | " |
| 14 | " | H | " | 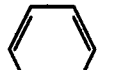CH₂— | " |
| 15 | " | CH₂CH₃ | CH₂CH₃ | 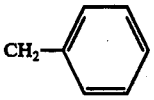CH₂— | " |
| 16 | 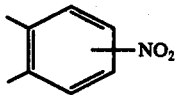—NO₂ | H | CH₂CH₂CH₂CH₃ | CH₂CH₂CH₂CH₃ | " |
| 17 | " | H | " | 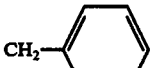CH₂— | " |
| 18 | " | H | " | 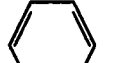 | " |

Table 3-continued
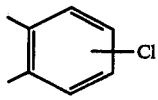
| No. | X | R | R₁ | R₂ | Shade on polyester |
|---|---|---|---|---|---|
| 19 | " | $CH_2CH_3$ | $CH_2CH_3$ | 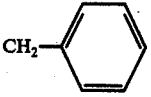 | " |
| 20 |  | H | $CH_2CH_2CH_2CH_3$ | $CH_2CH_2CH_2CH_3$ | " |
| 21 | " | H | " | 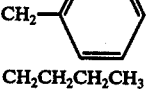 | " |
| 22 | " | H | " | 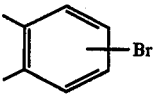 | " |
| 23 | " | $CH_2CH_3$ | $CH_2CH_3$ |  | " |
| 24 | 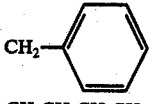 | H | $CH_2CH_2CH_2CH_3$ | $CH_2CH_2CH_2CH_3$ | " |
| 25 | " | H | " | 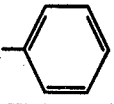 | " |
| 26 | " | H | 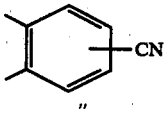 |  | " |
| 27 | 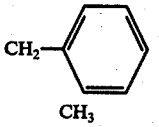 | H | $CH_2CH_2CH_2CH_3$ | $CH_2CH_2CH_2CH_3$ | " |
| 28 | " | H | " | 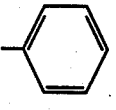 | " |
| 29 | " | H | 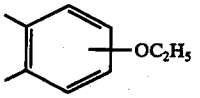 |  | " |
| 30 | 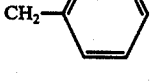 | H | $CH_3$ | (benzyl) | yellow |
| 31 | " | H | $CH_3$ | (benzyl) | " |

Table 3-continued

[Structure: naphthalene core with a fused ring containing O=C–N=C(–X)–N on top, and N=CR–N(R₁)(R₂) substituent at the 5-position]

| No. | X | R | R₁ | R₂ | Shade on polyester |
|---|---|---|---|---|---|
| 32 | [2-methyl-5-nitrophenyl] | H | C₄H₉ | C₄H₉ | orange |
| 32 | [o-tolyl] | H | C₄H₉ | CH₂—C₆H₅ | golden yellow |
| 33 | " | C₂H₅ | " | C₄H₉ | yellow |
| 34 | " | CH₃ | H | —C₆H₅ | " |
| 35 | " | C₂H₅ | " | " | " |
| 36 | " | C₃H₇ | " | " | " |
| 37 | " | C₂H₅ | " | —CH₂—C₆H₅ | " |
| 38 | [methylphenyl-CH₃] | H | " | C₄H₉ | reddish yellow |
| 39 | [dichlorophenyl-Cl,Cl] | " | " | " | " |
| 40 | [phenyl-SO₂—C₆H₅] | " | " | " | " |
| 41 | [phenyl-SO₂N(C₄H₉)₂] | " | " | " | " |
| 42 | [phenyl-CO—OC₂H₅] | " | " | " | " |
| 43 | [phenyl-CO—N(CH₃)₂] | " | " | " | " |
| 44 | [phenyl-CN] | " | " | " | " |
| 45 | [dimethylphenyl-CH₃,CH₃] | " | " | " | orange |

EXAMPLE 18-

A mixture of 23.2 parts of 3-hydroxy-4-nitronaphthalic acid anhydride [e.g. J. Cason et al., J. Org. Chem. 33, 3404 (1968)] and 12.0 parts of 3,4-diaminotoluene in 400 parts of glacial acetic acid is stirred for 15 minutes at 110° C, cooled and filtered. The product is washed and dried to yield 29.0 parts of an isomeric mixture of the hydroxynitronaphthoylenemethylbenzimidazole, which is methylated in acetone with potassium carbonate and dimethyl sulphate to give the isomeric mixture of the methoxynitronaphthoylenemethylbenzimidazole. Catalytic reduction in dimethyl formamide yields the corresponding amino derivative which is reacted in analogous manner to Example 9 to give the dibutyl amidine. Starting from the amounts indicated above yields 28.2 parts of a dyestuff which constitutes a mixture of the isomeric compounds of the formulae

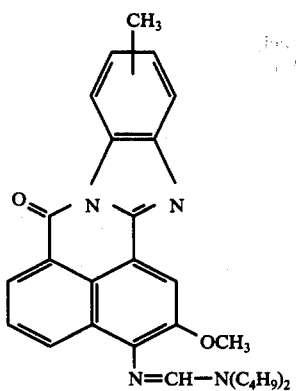

The dyestuff dyes polyester in red shades with good fastness to light. The dyestuffs of the formula

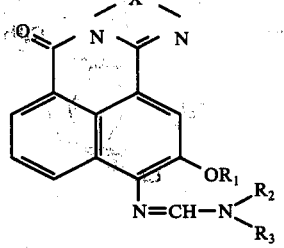

which are described in the following Table were obtained in analogous manner.

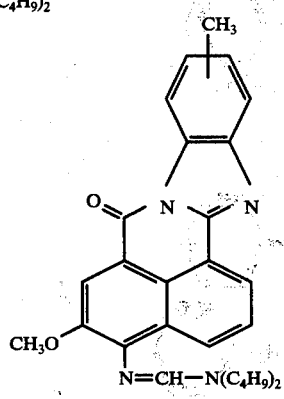

| No. | X | $R_1$ | $R_2$ | $R_3$ | Shade on polyester fibers |
|---|---|---|---|---|---|
| 1 | ![o-tolyl] | $CH_3$ | $CH_3$ | $CH_3$ | red |
| 2 | " | " | $C_4H_9$ | $C_4H_9$ | " |
| 3 | " | " | $CH_3$ | –C$_6$H$_5$ | " |
| 4 | " | " | $C_4H_9$ | –CH$_2$–C$_6$H$_5$ | " |
| 5 | " | " | $C_2H_5$ | " | $C_4H_9$ | " |
| 6 | " | " | –CH$_2$–C$_6$H$_5$ | | | " |
| 7 | p,m-xylyl | | $CH_3$ | $CH_3$ | $CH_3$ | " |
| 8 | " | " | " | –C$_6$H$_5$ | " |
| 9 | " | " | $C_4H_9$ | –CH$_2$–C$_6$H$_5$ | " |
| 10 | " | $C_2H_5$ | " | $C_4H_9$ | " |
| 11 | " | " | $CH_3$ | –C$_6$H$_5$ | " |

-continued
| No. | X | R₁ | R₂ | R₃ | Shade on polyester fibers |
|---|---|---|---|---|---|
| 12 | " | " | C₄H₉ | C₄H₉ | " |
| 13 | " | " | " | —CH₂—C₆H₅ | " |
| 14 | 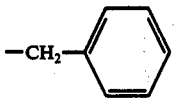 (2,4,5-trimethylphenyl) | CH₃ | " | " | " |
| 15 | " | " | " | —C₆H₅ | " |
| 16 | 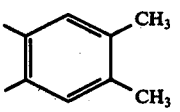 (CN-substituted) | CH₃ | C₄H₉ | C₄H₉ | " |
| 17 | " | " | CH₃ | —C₆H₅ | " |
| 18 | " | " | C₄H₉ | —C₆H₅ | " |
| 19 | 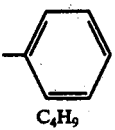 (Cl-substituted) | " | " | —CH₂—C₆H₅ C₄H₉ | " |
| 20 | " | " | CH₃ | —C₆H₅ | " |
| 21 | " | " | C₄H₉ | —CH₂—C₆H₅ | " |
| 22 | " | C₂H₅ | " | C₄H₉ | " |
| 23 | " | —CH₂—C₆H₅ | " | " | " |
| 24 | 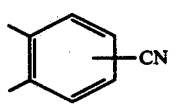 (—SO₂—C₆H₅) | CH₃ | " | " | " |
| 25 | " | " | CH₃ | —C₆H₅ | " |
| 26 | " | " | C₄H₉ | —CH₂—C₆H₅ | " |
| 27 | " | C₂H₅ | " | C₄H₉ | " |
| 28 | 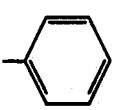 (—SO₂—N(C₄H₉)₂) | CH₃ | " | " | " |
| 29 | " | " | CH₃ | —C₆H₅ | " |

-continued

| No. | X | R₁ | R₂ | R₃ | Shade on polyester fibers |
|---|---|---|---|---|---|
| 30 | " | " | $C_4H_9$ | —CH₂—C₆H₅ | " |

EXAMPLE 19

A mixture of 5.5 parts of 3-hydroxy-nitronaphthalic acid anhydride [J. Carson et al., J. Org. Chem. 33, 3404 (1968)] and 3.0 parts of p-chloroaniline in 50 parts of glacial acetic acid is stirred for 3 hours at 115° C, cooled, and filtered. The product is washed and dried to yield 5.3 parts of 3-hydroxy-4-nitronaphthalic acid-p-chlorophenylimide, which is methylated in acetone and potassium carbonate and dimethyl sulphate to give the 3-methoxy derivative. Catalytic reduction yields the 4-amino compound from which, in analogous manner to Example 8, the dibutyl amidine is manufactured. Starting from the amounts indicated above yields 3.8 parts of the dyestuff of the formula

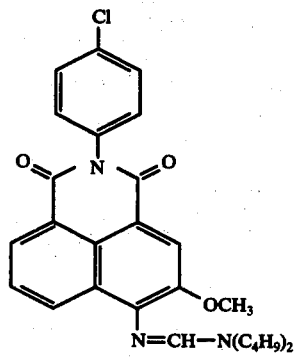

The dyestuff dyes polyester yellow with good fastness properties. The dyestuffs described in the following Table were manufactured in analogous manner.

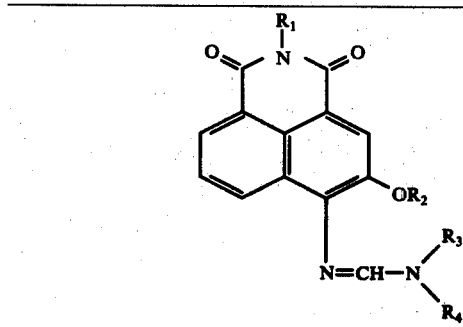

| No. | R₁ | R₂ | R₃ | R₄ | Shade on polyester |
|---|---|---|---|---|---|
| 1 | $C_4H_9$ | $CH_3$ | $C_4H_9$ | $C_4H_9$ | yellow |
| 2 | " | " | $CH_3$ | —C₆H₅ | " |
| 3 | " | " | $C_4H_9$ | —CH₂—C₆H₅ | " |
| 4 | " | $C_2H_5$ | " | $C_4H_9$ | " |
| 5 | " | —CH₂—C₆H₅ | " | " | " |
| 6 | —C₆H₅ | $CH_3$ | $C_4H_9$ | " | " |
| 7 | —C₆H₄—CH₃ | " | " | " | " |
| 8 | " | " | $C_2H_5$ | " | " |
| 9 | —C₆H₄—Cl | " | $CH_3$ | $CH_3$ | —C₆H₅ | " |
| 10 | " | " | $C_4H_9$ | —CH₂—C₆H₅ | " |
| 11 | " | " | $C_2H_5$ | " | $C_4H_9$ | " |
| 12 | " | " | " | $CH_3$ | —C₆H₅ | " |
| 13 | " | —CH₂—C₆H₅ | $C_4H_9$ | $C_4H_9$ | " |

-continued

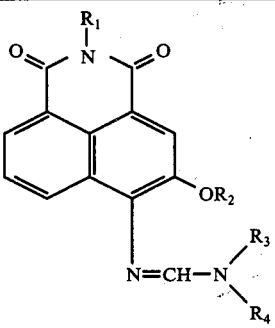

| No. | $R_1$ | $R_2$ | $R_3$ | $R_4$ | Shade on polyester |
|---|---|---|---|---|---|
| 14 | ![2,5-dichlorophenyl] | $CH_3$ | " | " | " |
| 15 | " | " | $CH_3$ | ![phenyl] | " |

EXAMPLE 20

51 parts of 4-acetylaminonaphthalic acid anhydride are mixed with b 30 parts of phenylacetic acid and 20 parts of anhydrous potassium acetate and the mixture is stirred for 4 hours at 220° C, in the course of which the water which forms is distilled off. The melt is then allowed to cool to 120° C and 400 parts of a 5% sodium hydroxide solution are slowly added. The resulting solution is stirred for 2 hours under reflux, filtered, and the filtrate is stirred into dilute hydrochloric acid solution. The so obtained 4-aminophenyl-perinaphthindan-dione (1.3) of the formula

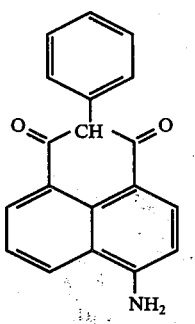

is etherified in the following manner. 14.5 parts of 4-amino-phenyl-perinaphthindan-dione are dissolved in 150 parts of dimethyl formamide. To this solution are added 3.5 parts of potassium hydroxide and 15 parts of 4-methyl-benzene-1-sulphonic acid methyl ester and the batch is stirred for 2 hours at 120° C. The solution is then poured into water. The isomeric mixture of the amino-methyl ether which has the following constitution, and which can be easily resolved by chromatography, is precipitated.

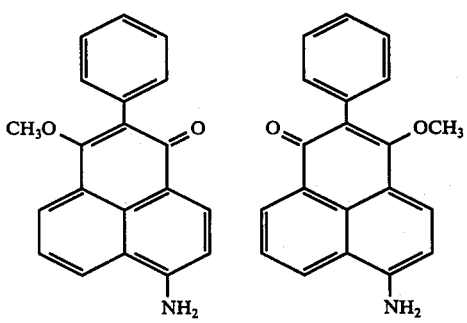

The isomeric mixture so obtained can be used as starting material for the manufacture of any desired amidines. These can be obtained by the process described in Example 1. The dyestuffs described in the following Table 4 were obtained in analogous manner.

TABLE 4

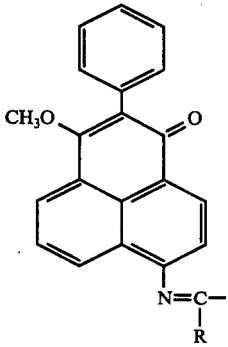

| No. | R | $R_1$ | $R_2$ | Shade on polyester |
|---|---|---|---|---|
| 1 | $CH_3$ | $C_4H_9$ | $C_4H_9$ | reddish yellow |
| 2 | H | $CH_2CH_2CH_2CH_3$ | $CH_2$–C₆H₅ | " |
| 3 | H | $CH_2CH_2CH_2CH_3$ | C₆H₅ | " |
| 4 | $CH_2CH_3$ | $CH_2CH_3$ | $CH_2$–C₆H₅ | " |
| 5. | H | $CH_2$–C₆H₅ | $CH_2$–C₆H₅ | " |

EXAMPLE 21

10 parts of the dyestuff No. 165 of Table 2 are added to 50 parts of conc. sulphuric acid and the mixture is stirred for 2 hours at 90°–95° C. After it has cooled the mixture is poured on ice, the residue is filtered off and dissolved in 250 parts of dilute sodium hydroxide solution. The sodium salt of the sulphonic acid of the dyestuff is precipitated by addition of sodium chloride. When dried it is a yellow, water-soluble powder which dyes polyamide in brilliant greenish yellow shades. The dyestuff has the following constitution:

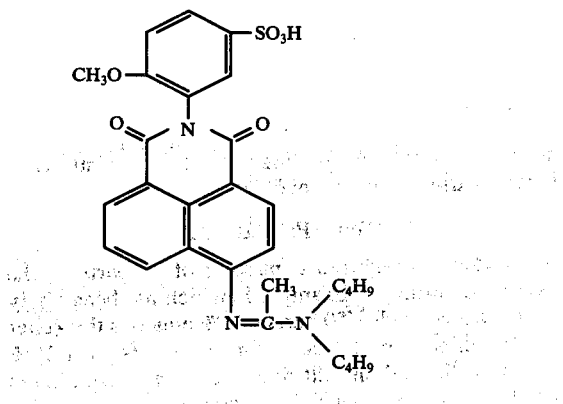

EXAMPLE 22

10 parts of the dyestuff No. 167 of Table 2 are added to 100 parts of sulphuric acid monohydrate and the mixture is stirred for 2 hours at 80°–85° C. The working up of the sulphonated dyestuff proceeds according to the particulars of Example 21. The resulting dyestuff of the following constitution

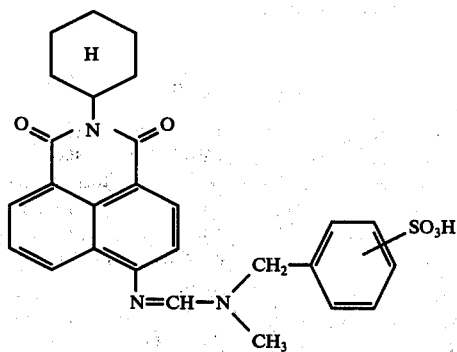

dyes polyamide fibres in brilliant greenish yellow shades. The following dyestuffs were manufactured in analogous manner:

| constitution: | shade on polyamide: |
|---|---|
| 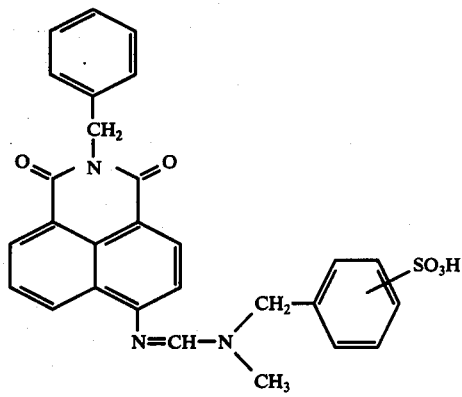 | greenish yellow |
| 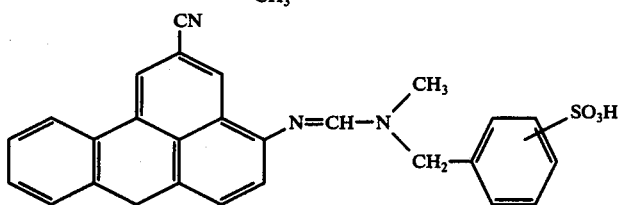 | orange |
| 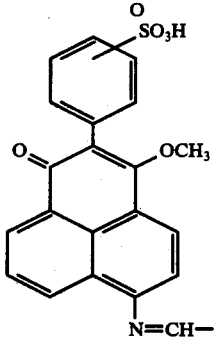 | red |
| 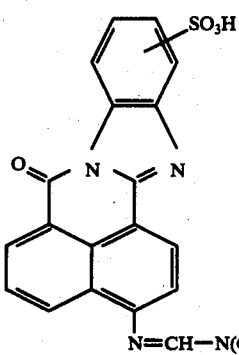 | orange |

Dyeing Procedure 1

1 Part of the dyestuff obtained according to Example 1 is ground wet with 2 parts of a 50% aqueous solution of the sodium salt of dinaphthylmethane-disulphonic acid and dried. This dyestuff preparation is stirred with 40 parts of a 10% aqueous solution of the sodium salt of N-benzyl-µ-heptadecylbenzimidazole-disulphonic acid and 4 parts of a 40% acetic acid solution are added. A dyebath of 4000 parts by volume is prepared therefrom by dilution with water. 100 parts of a cleansed polyester fibre material are put into this bath at 50° C, the temperature is raised within half an hour to 120° C to 130° C and dyeing is carried out at this temperature for 1 hour in a sealed vessel. The material is thereafter thoroughly rinsed. A full, yellow dyeing of excellent fastness to light and sublimation is obtained.

Dyeing Procedure 2

A mixture is prepared consisting of 25 parts of the dyestuff according to Example 1 (which has been finely ground beforehand), 550 parts of 8% aqueous thickener from modified locust bean gum, 550 parts of a 10% solution of the sodium salt of m-nitrobenzenesulphonic acid, 10 parts of a mixture of potassium oleate and pine oil, and bulked with water to 4000 parts. Using an impeller, the mixture is stirred until the dyestuff is fully dispersed and polyethylene terephthalate is subsequently printed with this paste. After it has been printed, the fabric is dried, steamed for 20 minutes at 1½ atmospheres (gauge pressure), rinsed with cold water over the course of 10 minutes, soaped twice hot with the addition of a small amount of hydrosulphite, rinsed cold, and dried. A fast, yellow print is obtained.

Dyeing Procedure 3

10 parts of synthetic polyamide fabric are put at 40° C into a dyebath which contains in 500 parts of water: 0.20 part of the dyestuff of Example 21, 0.25 part of sulphated ricinic acid butyl ester and 0.20 part of 40% acetic acid. The temperature is increased uniformly within 30 minutes to boiling point, whereupon dyeing is carried out for 1 hour at a gentle boil. The goods are then rinsed and dried to give a brilliant greenish yellow dyeing.

Dyeing Procedure 4

20 parts of the dyestuff obtained according to Example 1 are ground with 140 parts of water that contains 40 parts of sodium dinaphthylmethane-disulphonate. A padding liquor is prepared from 200 parts of the above dyestuff preparation, 100 parts of carboxymethyl cellulose (4% aqueous solution), and 700 parts of water, by stirring the dyestuff preparation into the previously diluted thickner using an impeller and subsequently adjusting the mixture with 80% acetic acid to pH 6. A polyester fabric is put into this liquor at 30° C, padded with a pick-up of 60%, and subsequently dried at 70°-80° C. The fabric is then heated to 210° C for 60 seconds on a tenter frame, then washed hot and thoroughly rinsed with cold water. It is dyed yellow with good fastness properties.

We claim:
1. 2-Cyano-3-amino-benzanthrones of the formula

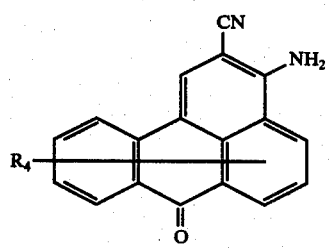

wherein $R_4$ represents a halogen atom, a lower alkyl group or a hydrogen atom.

2. 2-Cyano-3-amino-benzanthrone.

* * * * *

UNITED STATES PATENT AND TRADEMARK OFFICE
CERTIFICATE OF CORRECTION

PATENT NO. : 4,067,889
DATED : January 10, 1978
INVENTOR(S) : Siegfried Dengler, Peter Loew, Christian Zickendraht and Hansrudolf Schwander It is certified that error appears in the above-identified patent and that said Letters Patent are hereby corrected as shown below:

On cover page, insert (30) Foreign Application Priority Data should be --June 29, 1973 [CH] Switzerland .....9503/73--.

*Signed and Sealed this*

*Twenty-eighth* Day of *October 1980*

[SEAL]

Attest:

SIDNEY A. DIAMOND

*Attesting Officer*  Commissioner of Patents and Trademarks